(12) United States Patent
Petrov

(10) Patent No.: US 9,501,073 B2
(45) Date of Patent: Nov. 22, 2016

(54) LOW-NOISE SAMPLED VOLTAGE REGULATOR

(71) Applicant: Dmitry Petrov, Nepean (CA)

(72) Inventor: Dmitry Petrov, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

(21) Appl. No.: 14/594,290

(22) Filed: Jan. 12, 2015

(65) Prior Publication Data

US 2016/0202715 A1    Jul. 14, 2016

(51) Int. Cl.
*H02M 3/157* (2006.01)
*G05F 1/56* (2006.01)

(52) U.S. Cl.
CPC ............... *G05F 1/56* (2013.01); *H02M 3/157* (2013.01)

(58) Field of Classification Search
None
See application file for complete search history.

(56) References Cited

U.S. PATENT DOCUMENTS

| | | | | | |
|---|---|---|---|---|---|
| 5,063,489 | A | * | 11/1991 | Inaba | H02M 3/33523 323/902 |
| 7,102,557 | B1 | * | 9/2006 | Frith | H03M 3/502 327/337 |
| 2005/0062631 | A1 | * | 3/2005 | Washburn | H03M 1/661 341/144 |
| 2005/0151525 | A1 | * | 7/2005 | Komori | H01L 27/0623 323/282 |
| 2006/0220630 | A1 | * | 10/2006 | Xiao | H02M 3/33515 323/283 |
| 2007/0139241 | A1 | * | 6/2007 | Hales | H03M 3/464 341/143 |
| 2010/0181977 | A1 | | 7/2010 | Sohma et al. | |
| 2012/0086490 | A1 | | 4/2012 | Doo et al. | |
| 2012/0326517 | A1 | * | 12/2012 | Narwal | G06F 1/04 307/80 |
| 2013/0278233 | A1 | * | 10/2013 | Lee | G05F 1/575 323/280 |
| 2014/0176098 | A1 | | 6/2014 | Fang et al. | |
| 2014/0247035 | A1 | * | 9/2014 | Gupta | G05F 3/262 323/315 |

FOREIGN PATENT DOCUMENTS

| | | |
|---|---|---|
| CN | 101548456 | 9/2009 |
| CN | 103049243 | 4/2013 |

OTHER PUBLICATIONS

Hazucha et al. IEEE Journal of Solid State Circuits. vol. 40. No. 4, Apr. 2005, pp. 933-940.
Kaviani et al. ISSCC 2013, Session 17. Feb. 20, 2013, pp. 306-308.
PCT/CN2015/096290, International Search Report dated Feb. 24, 2016.
Shenzhen State Micro Tech Co, English Abstract of CN 103049243.
Sohma Shohtaroh, et al., English Abstract of CN 101548456.
Shenzhen State Micro Tech Co, Partial English Translation of CN 103049243.

* cited by examiner

*Primary Examiner* — Jeffrey Gblende

(57) ABSTRACT

A method and voltage regulator comprises a generator that generates an error difference between a reference and regulated voltage. A clocked ADC samples the voltage as a digital stream. A DAC converts the stream to analog signal(s). A current source driven by the signal(s) generate(s) the regulated voltage. The generator may be an op-amp or comparator comprising a buffer and/or a latch. The N-bit ADC may be a $\Sigma$-$\Delta$ modulator or N 1-bit ADC latches. The N-bit DAC may comprise 1-bit DACs comprising a switched-capacitor summer and a one stage RC LPF. Sampling the error up-converts flicker noise to the clock frequency which the DAC filters out. The current source may comprise N transistors with gates driven by a signal and sources tied to an independent power supply. Each signal may be weighted by a DAC weight. The apparatus may comprise a decoupling capacitor between the regulated voltage and ground.

41 Claims, 12 Drawing Sheets

US 9,501,073 B2

LOW-NOISE SAMPLED VOLTAGE REGULATOR

RELATED APPLICATIONS

Not Applicable.

TECHNICAL FIELD

The present disclosure relates to voltage regulators and in particular to DC voltage regulators for high-speed circuits.

BACKGROUND

A voltage regulator is a circuit designed to automatically maintain a constant voltage level. A DC voltage regulator may be used to stabilize a DC voltage used by a load, such as a processor or an analog circuit that is sensitive to fluctuation in supply voltage.

In general, performance of a voltage regulator may be qualified by its ability to perform two functions, namely providing a known accurate output regulated voltage, and ensuring that the regulated voltage remains substantially impervious to changes in the supply voltage.

A simple voltage regulator may comprise a series combination of a resistor and a diode. The voltage across the diode changes only slightly in response to changes in the input voltage since the diode's voltage-current response is substantially logarithmic. Such regulators may be suitable if precision in the regulated voltage is not a significant concern. In other words, while the second function of a regulator may be satisfied, the first function may not be.

FIG. 1 shows an example of a more complex voltage regulator circuit. The regulator, shown generally at 10, is provided with a supply voltage $V_{DD}$ 1, that has both a DC component 2 and a noise component 3. In some cases, the supply voltage $V_{DD}$ 1 may be less than 1 VDC, making it suitable for CMOS integrated circuit (IC) applications. The regulator 10 attempts to generate an output regulated voltage $V_{Reg}$ 4. The regulated voltage $V_{Reg}$ 4 is less than the supply voltage $V_{DD}$ 1. The regulated voltage $V_{Reg}$ 4 may be tuned by selection of a known, desired reference voltage $V_{Ref}$ 5, which may in some cases be set to a fraction between 0.5 and 0.75 of the supply voltage $V_{DD}$ 1, in the presence of a load circuit 6. The load 6 is coupled at respective ends between the regulated voltage $V_{Reg}$ 4 and ground.

In some cases, the load 6 may be a high-speed circuit, such as a voltage-controlled oscillator (VCO). A typical VCO circuit that may serve as the load 6, is shown in FIG. 1A. As may be seen, the VCO circuit may incorporate a plurality of MOS transistors. A change in the voltage supplied to a load 6, may cause the parameters of MOS transistors in the load 6, such as threshold voltage, gate capacitance and transconductance, to vary.

Where the load 6 is a high-speed circuit, the performance of the voltage regulator may be further qualified by a third function, namely that the regulated voltage $V_{Reg}$ 4 and reference voltage $V_{Ref}$ 5 exhibit low flicker noise. Flicker noise is a resistance fluctuation related to a direct current that is transformed to a voltage or current fluctuation through the operation of Ohm's law. Flicker noise manifests itself as a type of electronic noise having a power density spectrum as a function of frequency f, which may be modelled as 1/f. While flicker noise typically shows up as a low-frequency phenomenon, in frequency conversion circuits, such as an oscillator, such low-frequency noise may be heterodyned up to frequencies close to the carrier frequency, which may cause oscillator phase noise. Flicker noise in a supply voltage for a VCO may introduce noise in the oscillating signal that may introduce data reception and/or transmission errors, especially the VCO clock is used in a wireless and/or wireline data transmitter and/or receiver.

The VCO may be used to generate clocks in various electronic systems including high-speed serializer-deserializer (SerDes) applications. Such systems employ high clock purity signals. Such signals may be described in terms of deterministic and random jitter or phase noise.

Where the VCO is employed for phase locked loop (PLL) applications, variation in the supply voltage for the VCO may shift the VCO frequency beyond a range for which the PLL can provide compensation, resulting in the loss of phase lock.

The regulator 10 may comprise a transistor 7, a resistor 8, a decoupling capacitor 9 and a control circuit 11. The transistor 7 and resistor 8 comprise a voltage-controlled current source that acts as a pass-gate for driving the regulated voltage $V_{Reg}$ 4. The capacitor 9 shunts any high frequency fluctuation of the regulated voltage $V_{Reg}$ 4 to ground.

The transistor 7 may be an enhanced PMOS transistor that has a source 12, bulk 13, drain 14 and gate 15. The bulk 13 and source 12 are coupled together and to a first end of the resistor 7 and tied to the supply voltage $V_{DD}$ 1. The drain 14 is coupled to the second end of the resistor 8 and to a first end of the capacitor 9 and provides the regulated output voltage $V_{Reg}$ 4 signal. The gate 15 is coupled to an output of the control circuit 11. The transistor 7 draws current from the supply voltage 1 when enabled by the output 17 of the DAC. The regulated voltage $V_{Reg}$ 4 is less than the supply voltage $V_{DD}$ 1 by a DC drop between the source 12 and drain 14 of the transistor 7.

The first end of the resistor 8 is coupled to the source 12 and bulk 13 of the transistor 7 and tied to the supply voltage 1. The second end of the resistor 8 is coupled to the first end of the capacitor 9 and to the drain 14 of the transistor 7 and provides the regulated voltage $V_{Reg}$ 4 signal. The resistor 8 may, in some cases, be used in conjunction with the transistor 7 to provide a small quiescent current to the load 6. The amount of current flowing through the load 6 may be adjusted by selective adjustment of the control circuit 11

The first end of the capacitor 9 is coupled to the second end of the resistor 8 and to the drain 14 of the transistor 7 and provides the regulated voltage $V_{Reg}$ 4 signal. The second end of the capacitor 9 is grounded. The capacitor 9 decouples the regulated voltage, reducing its high frequency noise. In order to reduce log flicker (1/f) noise, it may be desirable to make the capacitor 9 extremely large. However, doing so is usually contra-indicated in "on-die" silicon implementations.

The control circuit 11 provides an output signal for controlling the voltage-controlled current source. The control circuit 11 has a control input 16, and output 17 and two switches 18, 19 that respectively couple the reference voltage $V_{Ref}$ 5 and the supply voltage $V_{DD}$ 1 to the output 17. The control input 16 opens one of the switches 18, 19 and simultaneously closes the other switch 19, 18 so that the output 17 reflects a voltage level that may be set to one of the supply voltage $V_{DD}$ 1 and the reference voltage $V_{Ref}$ 5, in accordance with the control input 16, to drive the voltage-controlled current source. The control input 16 is a static value that varies in time only to reflect temperature variations that are, by way of example, at least six orders of magnitude slower than changes in the current through the load 6. The control input 16 may reflect the temperature and SMOS process corner. The process corner is a design-of-experiments (DoE) technique used in semiconductor manufacturing to vary fabrication parameters used in applying an integrated circuit (IC) design to a semiconductor wafer.

The regulator 10 uses PMOS gates and resistors instantiated between the supply voltage $V_{DD}$ 1 and the regulated voltage $V_{Reg}$ 4. When appropriately sized, these isolate the regulator 10 from the supply voltage $V_{DD}$ 1. The regulator 10 exhibits low flicker and thermal noise on the regulated voltage $V_{Reg}$ 4, but suffers from poor load and line regulation precision and poor supply noise rejection especially at low supply voltages $V_{DD}$ 1, when the voltage drop on the resistor 8 or the PMOS gate 15 is below 0.4V. Additionally, the quality of the load and line regulation, supply noise rejection, temperature coefficient, dropout voltage and initial accuracy of the regulator 10 are highly dependent upon the process corner (that is, variation of the silicon parameters of the IC from lot to lot or within a given lot of samples due to manufacturing imperfections) and variations in the supply voltage $V_{DD}$ 1 and/or temperature. Such variations are known as Process, Voltage, Temperature (PVT) variations.

FIG. 2 shows an operational amplifier (Op-Amp) based voltage regulator configuration. The regulator, shown generally at 20, comprises the voltage-controlled current source comprising the transistor 7 and capacitor 9 of FIG. 1, but with an Op-Amp 21 in place of the static control circuit 11. The transistor 7 is configured in a manner similar to that of FIG. 1, with the exception that the gate 15 is coupled to an output 24 of the Op-Amp 21 rather than the control circuit 11.

The Op-Amp 21 has two inputs 22, 23 and an output 24. The first input 22 is coupled to the reference voltage $V_{Ref}$ 5. The second input 23 is coupled to the regulated voltage $V_{Reg}$ 4 or, in some cases, to a scaled version (not shown). The output 24 is coupled to the gate 15 of the transistor 7 and provides the control signal that drives the voltage-controlled current source. Thus, the combination of the Op-Amp 21 and transistor 7 provides a feedback loop that causes the regulated voltage $V_{Reg}$ 4 to approach, track and lock to the reference voltage $V_{Ref}$ 5 with high precision, defined by a frequency-dependent loop gain, which in some cases may be more than 10, of such system. The loop gain is defined by the bandwidth of the Op-Amp 21 and dependent upon the gain of the Op-Amp 21 and the transconductance of the transistor 7, as well as a scaling factor applied on the regulated voltage $V_{Reg}$ 4. If the frequency of the noise component 3 of the supply voltage $V_{DD}$ 1 is less than unit gain, the regulator 20 exhibits good line and load regulation over PVT, as may be seen by a plot of the loop gain as a function of frequency (not shown).

The regulator 20 exhibits good regulation precision and good supply noise rejection at low supply voltages $V_{DD}$ 1. Additionally, the performance is less dependent upon ambient PVT conditions. Unlike the regulator 10 of FIG. 1, the (1/f) flicker noise of the regulator 20 will not be reduced, even by making the capacitor 9 very large. Accordingly, the regulator 20 does exhibit high flicker and thermal noise on the regulated voltage $V_{Reg}$ 4, due to inherent high flicker noise of the Op-Amp 21 and amplification of the flicker and thermal noise within the loop through the loop gain.

A further voltage regulator circuit using a strong-arm latch comparator to supplement data-driven open-loop current is discussed in Kavlani, K., et al "A 6.4 GB/s Near-Ground Single-ended Transceiver for Dual-Rank DIMM Memory Interface Systems" *IEEE International Solid-State Circuits Conference,* 20 Feb., 2013, pp, 306-308, and is generally shown in FIG. 3. The circuit, shown generally at 30, comprises a regulator circuit 31, an open loop current source circuit 25 and decoupling capacitor 9. Capacitor 9 may be on the order of 76 pF.

The regulator circuit 31 comprises a comparator 32 and a first transistor 37. The comparator 32 has two inputs 33, 34, an output 35 and a clock input 36. The first input 33 is coupled to the reference voltage $V_{Ref}$ 5, which may be nominally set to a fraction of 0.5 of the supply voltage $V_{DD}$ 1 and the second input 34 is coupled to the regulated voltage $V_{Reg}$ 4. The comparator output 35 is coupled to the gate of the first transistor 37. The clock input 36 provides a clock signal, which may be on the order of 3.2 GHz, to clock the comparator 32. The clock signal is comparable to the transmitter clock, which is nominally 0.5 of the maximum data rate. The comparator 32 compares the reference voltage $V_{Ref}$ 5 and the regulated voltage $V_{Reg}$ 4 presented at its respective inputs 33, 34 and generates an error signal for each clock cycle that it presents, at the comparator output 35, to the gate of the first transistor 37. Thus, the comparator 32 provides a digital error signal at the clock rate provided at the clock input 36 to drive the first transistor 37.

The first transistor 37 may be a PMOS enhanced MOSFET with bulk (not shown) connected to the source or a substrate of the first transistor 37, whose gate is coupled to the comparator output 35. The source of the first transistor 37 is coupled to the source of a second transistor 38 in the open loop current source circuit 25 and tied to the supply voltage $V_{DD}$ 1. The drain of the first transistor 37 is coupled to the drain of second transistor 38 in the open loop current source circuit 25 and to the first end of decoupling capacitor 9 and provides the regulated voltage $V_{Reg}$ 4. The first transistor 37 draws current (IClosed) from the supply voltage $V_{DD}$ 1 when enabled by the comparator output 35 to supply the regulated voltage $V_{Reg}$ 4.

The regulator circuit 31 acts as a closed-loop (the current supplied at 35 to the regulated voltage $V_{Reg}$ 4 and the load 6 tends to track the regulated voltage $V_{Reg}$ 4) current source that provides current draw for the regulated voltage $V_{Reg}$ 4 when the open-loop (the current supplied at 38 to the regulated voltage $V_{Reg}$ 4 and the load 6 tends to depend upon the data input 27 only) current source circuit 25 is not. In effect, the regulator circuit 31 incorporates a 1-bit analog-to-digital converter (ADC) with no corresponding digital-to-analog converter (DAC) as a backup when the data 28 is a "0", to keep the regulated voltage $V_{Reg}$ 4 from collapsing to ground in the event of a protracted sequence of "0" s in the data stream 28.

The open-loop current source circuit 25 comprises an AND gate 26 and a second transistor 38. The AND gate 26 has first and second inputs 27, 28 and an output 29. The first input 27 is coupled to a data enable signal. The second input 28 is coupled to a data stream. The output 29 of the AND gate 26 is a "1" when the data presented at the second input 28 is a "1" and the data enable signal at the first input 27 is also a "1" (enabled). Thus, the open-loop circuit 25 only draws current ($I_{Closed}$) from the supply voltage $V_{DD}$ 1 when the signal at the gate 29 is a "0" to supply the regulated voltage $V_{Reg}$ 4.

The second transistor 38 may be a PMOS enhanced MOSFET, whose gate is coupled to the output 29 of the AND gate 26. The source of the second transistor 38 is coupled to the source of the first transistor 37 in the regulator circuit 31 and tied to the supply voltage $V_{DD}$ 1. The drain of the second transistor 38 is coupled to the drain of the first transistor 37 in the regulator circuit 31 and to the first end of decoupling capacitor 9 and provides the regulated voltage $V_{Reg}$ 4. The second transistor 38 draws current ($I_{Open}$) from the supply voltage $V_{DD}$ 1 when the data presented at the second input 28 of the AND gate 26 is a "0" and the data enable signal at the first input 27 is also a "1" (enabled) to supply the regulated voltage $V_{Reg}$ 4.

The open-loop circuit 25 serves an auxiliary function to source additional current when the data presented at the second input 28 of the AND gate 26 is a long stream of "0"s or "1"s during which the transistor 38 acts as a fully closed or fully open switch. In a nominal case, the open-loop circuit 25 may source on the order of 90% of the current to supply the regulated voltage $V_{Reg}$ 4. However, the ripple generated by the circuit 30 may be several percent of the reference voltage $V_{Ref}$ 5, without even accounting for the noise 3 in the supply voltage, rendering it unsuitable for a high-speed load 6, such as a VCO.

BRIEF DESCRIPTION OF THE DRAWINGS

Example embodiments of the present disclosure will now be described by reference to the following figures, in which identical reference numerals in different figures indicate identical elements and in which.

SUMMARY

Figure 1A:
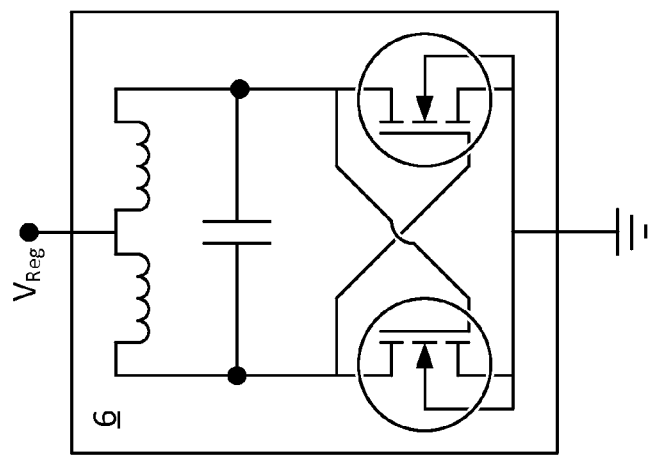
FIG. 1A is a schematic view of a voltage-controlled oscillator (VCO) that may serve as the load in FIG. 1.
Figure 1:
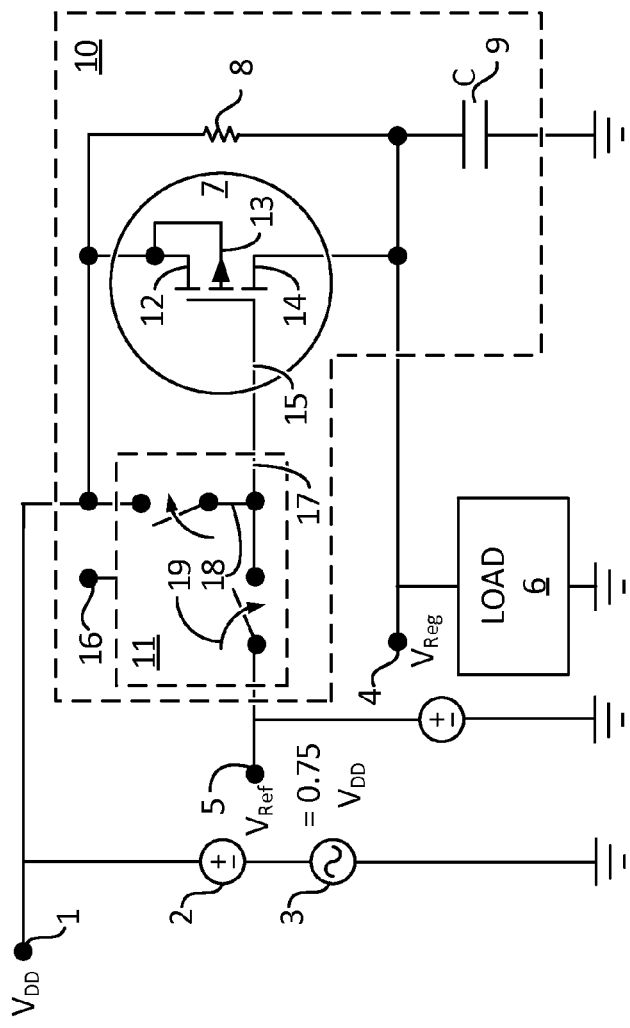
FIG. 1 is a schematic view of a voltage-controlled current source-based voltage regulator circuit.

The present disclosure discloses a low-noise sampled voltage regulator circuit that is suitable for high-speed noise-sensitive loads, such as a VCO and a method for providing a regulated voltage supply for a load. The regulator circuit comprises an voltage error generator, such as a comparator or an Op-Amp, configured to generate an error voltage representing a difference between the reference voltage and the regulated voltage, an analog-to-digital converter (ADC) clocked by a high-speed sampled clock signal configured to sample the error voltage with the clock signal to generate an N-bit digital control stream at the clock frequency, a digital-to-analog converter (DAC) configured to convert the digital control stream into at least one analog control signal and a voltage-controlled current source that is driven by the at least one analog control signal to generate the regulated voltage. These elements track and minimize the error between the reference voltage and the regulated voltage applied to the load.

The sampling of the error voltage at the clock frequency of the clock signal up-converts any flicker noise of the error voltage generator from at or near DC to the sampled clock frequency in the digital control stream. Then when the digital control stream is converted back to the at least one analog control signal, the low-pass filtering effect of the DAC filters out the up-converted flicker noise, substantially reducing the jitter of the regulated voltage as well as the thermal noise of the digital control stream.

The voltage regulator circuit can operate at low supply voltages below 1 VDC, which may be desirable for CMOS IC applications. The voltage regulator circuit generates a precisely regulated voltage supply suitable for powering a VCO. The voltage regulator circuit achieves low flicker and thermal noise on the regulated voltage supply and provides supply noise rejection over a wide frequency range with low performance dependency on PVT.

In some example embodiments, the voltage regulator circuit may be integrated on a chip and has a small occupied die area. In some example embodiments, the voltage regulator circuit may comprise discrete components.

In one example-embodiment of the present disclosure, there is provided a voltage regulator circuit configured to generate a regulated voltage for a load, that approaches a known reference voltage. The regulator circuit comprises a voltage error generator, a first clock signal, converter, a filter, and a voltage-controlled current source. The voltage error generator is configured to generate an error voltage representing a difference between the reference voltage and the regulated voltage. The first clock signal is at a first clock frequency. The is configured to sample the error voltage at the first clock signal and to generate a first control signal in which a noise component of the error voltage is up-converted to substantially the first clock frequency. The filter is configured to generate at least one second control signal from the first control signal in which the up-converted noise thereof is substantially reduced from the at least one second control signal. The voltage-controlled current source is driven by the at least one second control signal and is configured to generate the regulated voltage supply.

The voltage error generator can have a first input coupled to the reference voltage and a second input coupled to the regulated voltage supply generated by the voltage-controlled current source. The voltage error generator can be a comparator or an operational amplifier (Op-Amp). The comparator can comprise a voltage buffer and/or at least one sampling latch.

The comparator can be clocked by a second clock signal and the error voltage can be a sampled error signal sampled at a frequency of the second clock signal. The first and second clock signals can have a common frequency. The first and second clock signals can be the same.

The error voltage can be a continuous time error signal.

The voltage error generator can be supplied by a power supply that is independent of a power supply for the voltage-controlled current source.

The voltage error generator can have differential outputs for generating a differential error voltage signal.

The first clock frequency can be in excess of 100 Hz. The first clock frequency can be about 9.6 GHz or about 19.6 GHz. The first clock signal can be generated by the load.

The converter can be an N-bit analog-to-digital converter (ADC) that generates an N-bit digital control stream as the first control signal. N can be 1. N can exceed 1 and the ADC can comprise a plurality of sampling latches each comprising a 1-bit ADC, each configured to generate one bit of the N-bit digital control stream.

The converter can be a Sigma-Delta (Σ-Δ) modulator.

The converter can be supplied by a power supply that is independent of a power supply for the voltage-controlled current source.

The converter can have differential inputs for accepting a differential error voltage signal.

The filter can be an N-bit DAC that converts the first control signal that is an N-bit digital control stream. N can be 1. N can exceed 1 and the DAC can comprise a plurality of 1-bit DACs, each configured to convert one bit of the N-bit digital control stream.

The filter can comprise a switched-capacitor charge summer.

The filter can comprise a low pass filter. The low pass filter can be a one stage RC filter.

The filter can be clocked by a second clock signal. The error voltage can be a sampled error signal sampled at a frequency of the second clock signal. The first and second clock signals can have a common frequency. The first and second clock signals can be the same.

The filter can be supplied by a power supply that is independent of a power supply for the voltage-controlled current source.

The voltage-controlled current source can comprise at least one transistor. Each at least one transistor can have a gate driven by one of the at least one control signals. The at least one second control signal may be weighted to correspond to a weight of the filter from which the at least one second control signal emanates. The source of the at least one transistor can be coupled to a power supply that is independent of any power supply that may provide power to the feedback element, the converter, the filter or any combination of any of these. The drain of the at least one transistor can be coupled to the regulated voltage supply and to an input of the error voltage generator.

The voltage regulator circuit can comprise a decoupling capacitor positioned between the regulated voltage supply and ground.

The voltage regulator circuit can comprise an integrated circuit.

The load can be a voltage-controlled oscillator.

In one example embodiment of the present disclosure there is provided a method for providing a regulated voltage for a load that approaches a known reference voltage. The method comprises actions of generating an error voltage representing a difference between the reference voltage and the regulated voltage, sampling the error voltage at a first clock frequency to generate a first control signal in which a noise component of the error voltage is up-converted to substantially the first clock frequency, converting the first control stream to at least one second control signal in which the up-converted noise of the first control signal is substantially reduced from the at least one second control signal, and driving a voltage-controlled current source with the at least one second control signal to generate the regulated voltage supply.

Description

Figure 4:
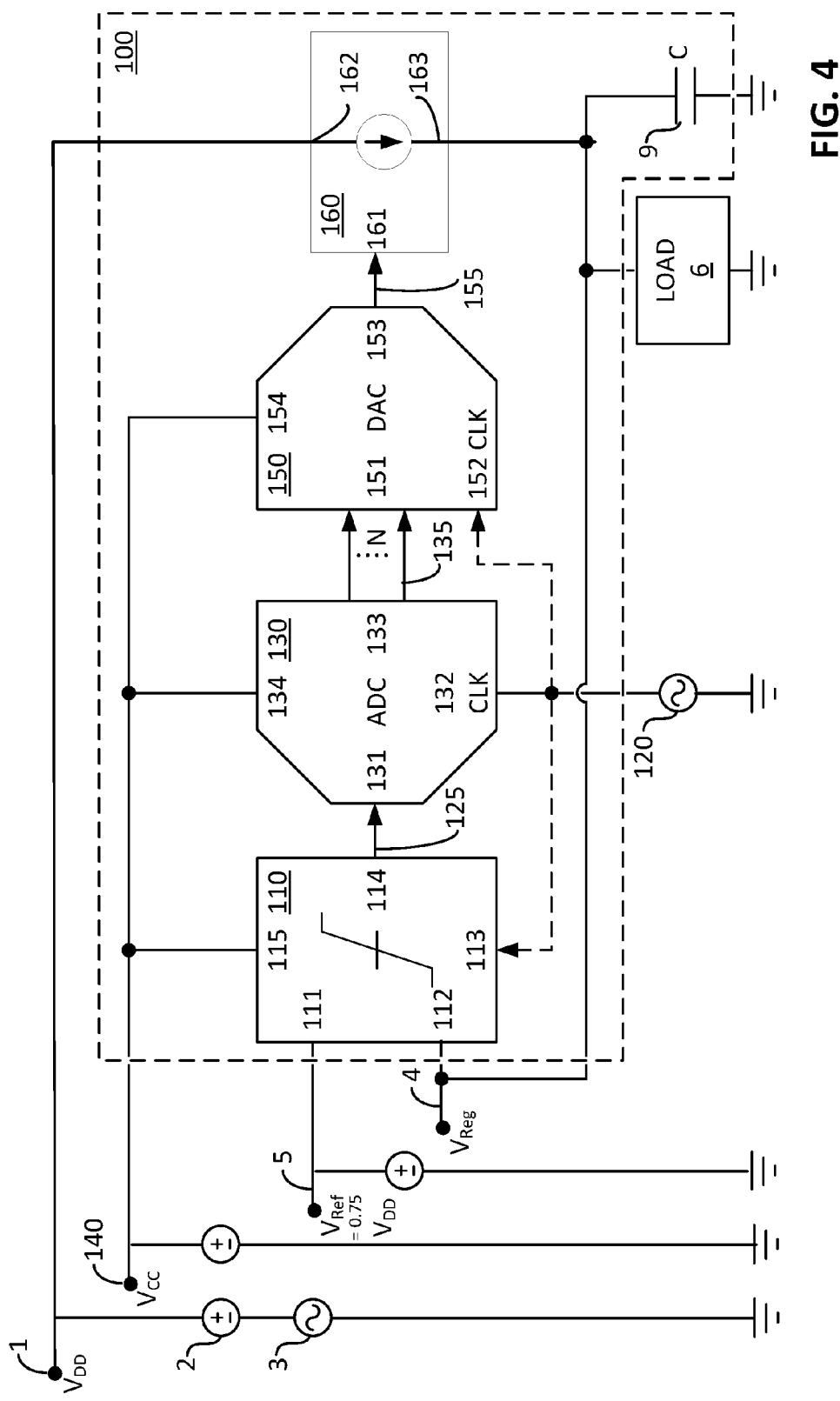
FIG. 4 is a schematic view of a low-noise sampled voltage regulator in accordance with an example embodiment of the present disclosure.

A first example embodiment of the low-noise sampled voltage regulator circuit is shown in FIG. 4. The regulator circuit, shown generally at 100, comprises a voltage error generator such as a comparator 110, a high-speed clock signal 120, an analog-to-digital converter (ADC) 130, a digital-to-analog converter (DAC) 150, a voltage-controlled current source 160 and a decoupling capacitor 9.

The comparator 110 has at least two inputs 111, 112, 113 and an output 114. The first input 111 is coupled to the reference voltage $V_{Ref}$ 5. The second input 112 is coupled to the regulated voltage $V_{Reg}$ 4. The third input 113, if implemented, may be coupled to a high-speed clock signal 120. In some example embodiments, the clock signal is the same or at the same frequency as a clock signal feeding a clock input 132 of the ADC 130 and/or a clock signal feeding a clock input 152 of the DAC 150. In some example embodiments, the clock signal 120 may be independently clocked. In some example embodiments, the clock signal 120 may be a divided version of the clock signal feeding clock input 132 of the ADC 130 or of the clock signal feeding clock input 152 of the DAC 150 or both. In some example embodiments, the clock signal feeding clock input 132 of the ADC 130 or the clock signal feeding clock input 152 of the DAC 150 or both may be a divided version of the clock signal 120. In some example embodiments, the clock signal 120 may have a fixed phase difference relative to the clock signal feeding the clock input 132 of the ADC 130 or the clock signal feeding the clock input 152 of the DAC 150 or both. The output 114 of the comparator 110 is coupled to an input 131 of the ADC 130 and outputs an error voltage 125.

In some example embodiments, the clock signal 120 has a frequency substantially in excess of 1 GHz. In some example embodiments, the clock signal 120 has a frequency of about 9.6 GHz or 19.6. In some example embodiments, the clock signal 120 may be generated by a dedicated clock generator such as a ring oscillator (not shown). The noise of the clock signal 120 waveform is not a significant concern. In some example embodiments, the clock signal 120 may be drawn from an existing clock generator, including, without limitation, from the load 6. In doing so, a separate clock generator and the concomitant current draw and silicon area expenditure may be dispensed with. For example, if the load 6 is or incorporates a VCO (by way of non-limiting example, in a phase-locked loop (PLL)), the VCO output may be used to supply the clock signal 120. In some example embodiments, the PLL has a reference clock that has a frequency sufficiently high to use as the clock signal 120. In some example embodiments, an external clock generator may be utilized to supply the clock signal 120 until such time as adequate regulation of the regulated voltage $V_{Reg}$ 4 is achieved, so that a clock signal from the load 6, such as a reference clock of a PLL may become accessible and reliable. At such point, the external clock generator may be switched out in favour of the clock signal from the load 6.

Additionally, the comparator 110 is supplied at a power input 115 with an IC supply voltage $V_{CC}$ 140, which, in some example embodiments, is shared by a corresponding power input 134 of the ADC and/or a corresponding power input 153 of the DAC 150. The IC supply voltage $V_{CC}$ 140 is independent from the supply voltage $V_{DD}$ 1. This minimises the propagation of noise, from the comparator 110, ADC 130 and/or DAC 500, to the regulated voltage $V_{Reg}$ 4, that is independently supplied through the voltage-controlled current source 160 through the supply voltage $V_{DD}$ 1. In some example embodiments, this minimizes PVT dependence and thermal noise contribution of the regulator circuit 100. In some example embodiments, the IC supply voltage $V_{CC}$ 140 is a fraction of the supply voltage $V_{DD}$ 1. This may substantially reduce the power consumption of the regulator 100. In some example embodiments, the IC supply voltage $V_{CC}$ 140 may range from 0.7-1.0 VDC.

The comparator 110 generates an error voltage 125 representing and proportional to a difference between the reference voltage $V_{Ref}$ 5 and the regulated voltage $V_{Reg}$ 4.

Since the regulated voltage $V_{Reg}$ 4 is generated by the voltage-controlled current source 160 from processing by the voltage regulator circuit 100 of the output of the voltage error generator, a feedback circuit in the form of a voltage-locked loop is created.

The ADC 130 has two inputs 131, 132 and an output 133. The first input 131 is coupled to the output 114 of the comparator 110 and accepts the error voltage 125. The second input 132 is coupled to a high-speed clock signal 120 which, in some example embodiments, is the same or at the same frequency as a clock signal 120 feeding a clock input 152 of the DAC 150 and/or, if implemented, the clock signal feeding the clock input 113 of the comparator 110. In some example embodiments, the clock signal 120 may be independently clocked. In some example embodiments, the clock signal 120 may be a divided version of the clock signal feeding clock input 113 of the comparator 110 or of the clock signal feeding clock input 152 of the DAC 150 or both. In some example embodiments, the clock signal feeding clock input 113 of the comparator 110 or the clock signal feeding clock input 152 of the DAC 150 or both may be a divided version of the clock signal 120. In some example embodiments, the clock signal 120 may have a fixed phase difference relative to the clock signal feeding the clock input 113 of the comparator 130 or the clock signal feeding the clock input 152 of the DAC 150 or both. The output 133 of the ADC 130 is coupled to an input 151 of the DAC 150 and outputs an N-bit digital control stream 135.

The ADC 130 is supplied at power input 134 with the IC supply voltage $V_{CC}$ 140, which is shared by corresponding power input 115 of the comparator 110 and/or corresponding power input 154 of the DAC 150. In some example embodiments, the IC supply voltage $V_{CC}$ 140 is a fraction of the supply voltage $V_{DD}$ 1. This may substantially reduce the power consumption of the regulator 100. In some example embodiments, the IC supply voltage $V_{CC}$ 140 may range from 0.7-1.0 VDC. The IC supply voltage $V_{CC}$ 140 is independent from the supply voltage $V_{DD}$ 1. This minimises the propagation of noise, from the comparator 110, ADC 130 and/or DAC 500, to the regulated voltage $V_{Reg}$ 4, that is independently supplied through the voltage-controlled current source 160 through the supply voltage $V_{DD}$ 1. In some example embodiments, this minimizes PVT dependence and thermal noise contribution of the regulator circuit 100.

The ADC 130 samples the error voltage 125 at the frequency of the clock signal 120 and generates an N-bit digital control stream 135 clocked at the frequency of the clock signal 120. In generating the digital control stream 135, any flicker from the regulated voltage $V_{Reg}$ 4 that is manifested in the error voltage 125, is up-converted from at or near DC to the frequency of the clock signal 120.

In some example embodiments, especially if the frequency of the clock signal 120 exceeds 1 GHz, the value of N may be reduced. In some example embodiments, the value of N may be 1.

The DAC 150 has two inputs 151, 152 and an output 153. The first input 151 is coupled to the output 133 of the ADC 130 and accepts the N-bit digital control stream 135. The second input 152 is coupled to a high-speed clock 120 which, in some example embodiments, is the same or at the same frequency as the clock signal 120 feeding the clock input 132 of the ADC 130 and/or, if implemented, the clock signal feeding the clock input 113 of the comparator 110. In some example embodiments, the clock signal 120 may be independently clocked. In some example embodiments, the clock signal 120 may be a divided version of the clock signal feeding clock input 113 of the comparator 110 or of the clock signal feeding clock input 133 of the ADC 130 or both. In some example embodiments, the clock signal feeding clock input 113 of the comparator 110 or the clock signal feeding clock input 133 of the ADC 130 or both may be a divided version of the clock signal 120. In some example embodiments, the clock signal 120 may have a fixed phase difference relative to the clock signal feeding the clock input 113 of the comparator 130 or the clock signal feeding the clock input 133 of the ADC 130 or both. The output 153 of the DAC 150 is coupled to an input 161 of the voltage-controlled current source 160 and drives the voltage-controlled current source 160.

The DAC 150 is supplied at power input 154 with the IC supply voltage $V_{CC}$ 140, which is shared by corresponding power input 115 of the comparator 110 and/or corresponding power input 134 of the ADC 130. In some example embodiments, the IC supply voltage $V_{CC}$ 140 is a fraction of the supply voltage $V_{DD}$ 1. This may substantially reduce the power consumption of the regulator 100. In some example embodiments, the IC supply voltage $V_{CC}$ 140 may range from 0.7-1.0 VDC. The IC supply voltage $V_{CC}$ 140 is independent from the supply voltage $V_{DD}$ 1. This minimises the propagation of noise, from the comparator 110, ADC 130 and/or DAC 500, to the regulated voltage $V_{Reg}$ 4, that is independently supplied through the voltage-controlled current source 160 through the supply voltage $V_{DD}$ 1. In some example embodiments, this minimizes PVT dependence and thermal noise contribution of the regulator circuit 100.

The DAC 150 converts the digital control stream 130 arriving at input 153 to an analog control signal that it presents at output 153 to the voltage-controlled current source 160. In so doing, a low-pass filtering effect of the DAC 150 filters out the up-converted flicker noise, substantially reducing the jitter of the regulated voltage $V_{Reg}$ 4.

The voltage-controlled current source 160 has two inputs 161, 162 and an output 163. The input 161 is coupled to the output 153 of the DAC 150. The input 162 is coupled to the supply voltage $V_{DD}$ 1, which is independent from the IC supply voltage $V_{CC}$ 140. This minimises the propagation of noise, from the comparator 110, ADC 130 and/or DAC 150, to the regulated voltage $V_{Reg}$ 4, that is independently supplied through the voltage-controlled current source 160 through the supply voltage $V_{DD}$ 1. In some example embodiments, this minimizes PVT dependence of the regulator circuit 100. In some example embodiments, the IC supply voltage $V_{CC}$ 140 is a fraction of the supply voltage $V_{DD}$ 1. In some example embodiments, the supply voltage $V_{DD}$ 1 may range from 1.1-1.8 VDC. The output 163 is coupled to a first end of the capacitor 9 and provides the regulated output voltage $V_{Reg}$ 4 signal. The voltage-controlled current source 160 draws current from the supply voltage $V_{DD}$ 1 in an amount proportional to the level of the analog control signal 155 at the output 153 of the DAC 150.

The gain of the voltage-controlled current source 160 determines the current driving capability of the regulator circuit 100.

The voltage-controlled current source 160 adjusts the current in accordance with the analog control signal until the regulated voltage $V_{Reg}$ 4 reaches the reference voltage $V_{Ref}$ 5.

The first end of the capacitor 9 is coupled to the output 163 of the voltage-controlled current source 160 and provides the regulated voltage $V_{Reg}$ 4 signal. The second end of the capacitor 9 is grounded. The capacitor 9 decouples the regulated voltage $V_{Reg}$ 4 signal, reducing both ripple and noise.

Figure 5:
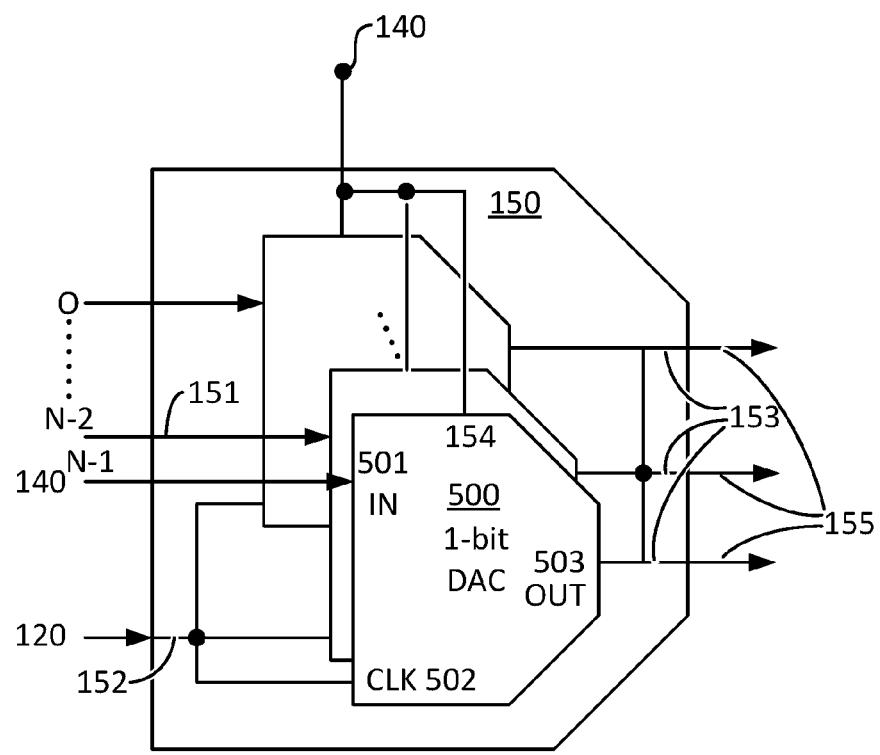
FIG. 5 is a schematic view of an example embodiment of an N-bit digital-to-analog converter (DAC) suitable for use in the example embodiment of FIG. 4.
Figure 5A:
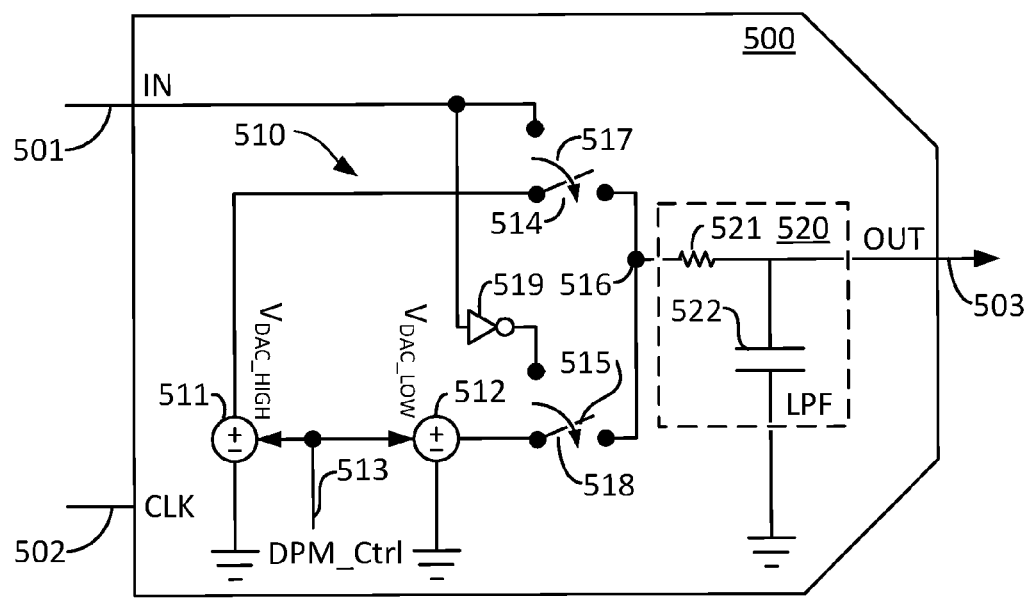
FIG. 5A is a schematic view of an example embodiment of a 1-bit digital-to-analog converter (DAC) suitable for use in the example embodiment of FIG. 5.

The low-pass filtering effect of the DAC 150 may be better understood from considering of FIGS. 5 and 5A. FIG. 5 shows further detail of an example embodiment of the DAC 150 of FIG. 4. The DAC 150 may in some example embodiments be comprised of N 1-bit DACs 500, where N is the number of bits in the digital control stream 135. Each 1-bit DAC 500 has two inputs 501, 502 and an output 503. The first inputs 501 of each of the N 1-bit DACs 500 in the N-bit DAC 150 accepts one of the N-bit binary signals of the digital control stream 135. The second inputs 502 of each of the N 1-bit DACs 500 in the N-bit DAC 150 are all tied together and coupled to the clock signal 120. The output 503 of each of the N 1-bit DACs 500 in the N-bit DAC 150 is an analog signal. The output 503 of each of the N 1-bit DACs 500 in the N-bit DAC 150 is connected to a corresponding one of an N-bit input 161 of the voltage-controlled current source 160. As will be discussed in detail in respect of FIG. 8, each such input 161 is a gate 15 of a corresponding one of N transistors 7 in the voltage-controlled current source 160. Thus, it may be seen that in this example embodiment, the N-bit DAC 150 may be processed in parallel bit-wise fashion.

Respective power inputs 504 of each of the DACs 500 are tied to the common IC supply voltage $V_{CC}$ 140.

FIG. 5A shows further detail of an example embodiment of one of the 1-bit DACs 500 of FIG. 5. The DAC 500 may be, as shown, a switched-capacitor charge summer, shown generally at 510, followed by a low pass filter 520.

In some example embodiments, the switched-capacitor charge summer 510 comprises a first voltage source $V_{Dac\_High}$ 511 and a second voltage source $V_{Dac\_Low}$ 512 that respectively represent the voltage level attributable to a "1" and a "0" of the bit stream arriving on input 501. In some example embodiments, the precise voltage levels of the first voltage source 511 and the second voltage source 512 may be adjusted by a process and temperature monitoring control signal DPM_Ctrl 513 if there is process detection circuitry available, such as a functional cell implemented on-die, usually close to a circuit that uses its outputs, to detect process skew, or deviation of transistor parameters related to the manufacturing process, and the ambient temperature on-die, so that thermal adjustments may be made to compensate for a particular process corner of the IC manufacturing process employed. The adjustment by the process monitoring control signal 513 controls the ripple in the voltage levels output by the first voltage source 511 and the second voltage source 512.

The noise contribution of the DAC 500 to the noise on the regulated voltage $V_{Reg}$ 4 can be made arbitrarily low by known measures, including without limitation, ensuring that the first and second voltage sources 511, 512 are low-noise sources.

In some example embodiments, the first voltage source 511 and second voltage source 512 may be obtained from elsewhere on the IC, including in some example embodiments, the load 6. For example, if the load 6 incorporates a PLL, one or both of the voltage sources 511, 512 may incorporate the (low-noise) PLL reference voltage generator(s).

The output of the first voltage source 511 is fed into a first end of a first switch 514 and the output of the second voltage source 512 is fed into a first end of a second switch 515. The second ends of each of the first switch 514 and the second switch 515 are tied together at a common termination 516. Each of the switches 514, 515 is closed when a respective enable input 517, 518 is activated. In some example embodiments, the enable input 517 of one of the switches 514 is tied to the bit stream arriving on input 501. In some example embodiments, the enable output 518 of the other of the switches 515 is separated from the bit stream arriving on input 501 by an inverter 519.

Thus, when a "1" is presented at the input 501, one enable input 517 is activated and the corresponding switch 514 is closed, so that the voltage corresponding thereto 511 is presented to the common termination 516. At the same time, the other enable input 518 is not activated so that the corresponding switch 515 remains open, and the voltage corresponding thereto 512 is not presented to the common termination 516. When a "0" is presented at the input 501, the enable input 517 is not activated so that the corresponding switch 514 remains open and the voltage corresponding thereto 511 is not presented to the common termination 516. At the same time, the other enable input 518 is activated and the corresponding switch 515 is closed, so that the voltage corresponding thereto 512 is presented to the common termination 516. As a result of the foregoing, a chopped analog voltage signal, varying between one and the other of the levels provided by the two voltage sources 511, 512 is presented to the common termination 516 in accordance with the digital bit stream that is presented at the input 501.

The low pass filter 520 may, in some example embodiments, a simple one-stage RC filter. Such an embodiment comprises a resistor 521 and a capacitor 522. The low pass filter 520 has a single input 523 and an output 524. The input 523 is coupled to the common termination 516 of the switched-capacitor charge summer 510. The output 524 is coupled to the output 503 of the 1-bit ADC 500. A first end of the resistor 521 is coupled to the input 523. A second end of the resistor 521 is coupled to a first end of the capacitor 522 and to the output 524. The first end of the capacitor 522 is coupled to the second end of the resistor 521 and to the output 524. The second end of the capacitor 522 is grounded.

The low pass filter 520 smoothes out the chopped analog voltage signal presented to the common termination 516 into an analog control voltage.

As indicated previously, given that the first stage 110 up-converts any flicker from the regulated voltage $V_{Reg}$ 4 that is manifested in the error voltage is up-converted from at or near DC to the clock frequency while generating the digital control stream 130, the low pass filter 520, while smoothing out the chopped analog control voltage signal, will filter out the up-converted flicker noise, reducing the jitter introduced in the regulated voltage $V_{Reg}$ 4.

Thus, the DAC 150 allows a controlled swing on the voltage-controlled current source, which reduces ripple on the regulated voltage $V_{Reg}$ 4.

Figure 6:
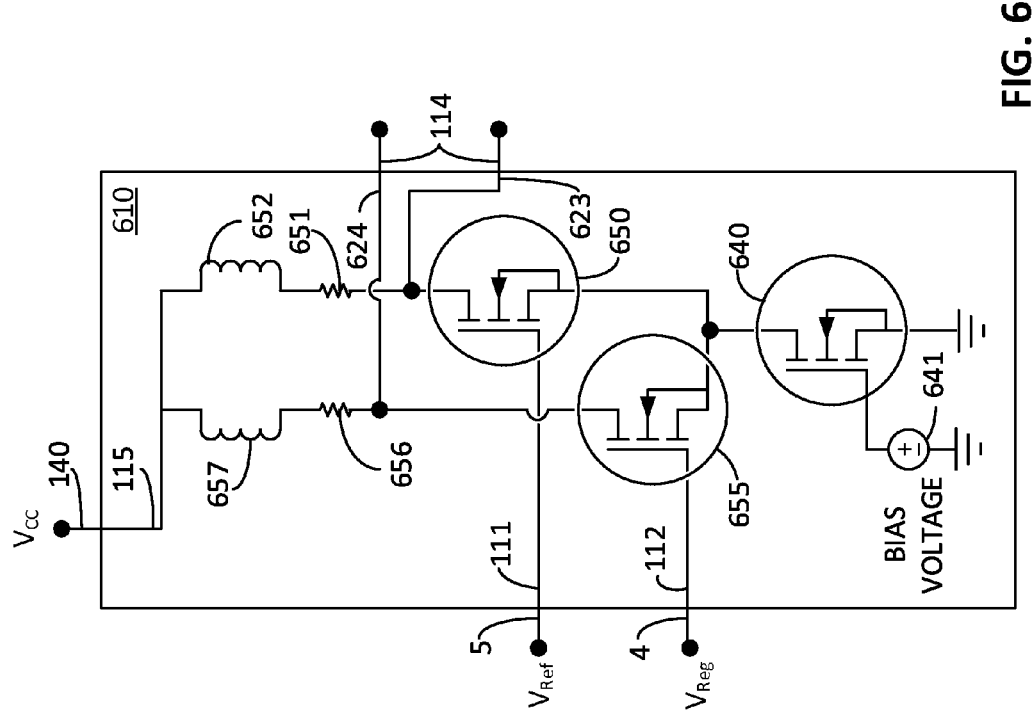
FIG. 6 is a schematic view of an example embodiment of a voltage buffer suitable for use as, or as part of a comparator in the example embodiment of FIG. 4.

Turning now to FIG. 6, there is shown an example embodiment of an implementation of a voltage buffer 610 that may act as or a preliminary portion of the comparator 110. In principle, provided the gain is sufficient, any buffer or op-amp may serve as, or as part of the comparator 110. In some example embodiments, the voltage buffer 610 may be dispensed with and the sampling latch 630 described in FIG. 7 may serve as both the comparator 110 and the ADC 130. Where the voltage buffer 610 is implemented, improved error detection sensitivity may be experienced since the voltage buffer 610 amplifies the error voltage 125 prior to forwarding it to the sampling latch 630 for further comparison and analog-to-digital conversion. Additionally, where the voltage buffer 610 is implemented, kickback, which would otherwise be introduced by the sampling latch 630 on the regulated voltage $V_{Reg}$ 4, may be reduced.

In some example embodiments and as shown in FIG. 6, the output 114 may be configured as differential outputs 623, 624. Those having ordinary skill in this art will appreciate that such differential outputs may provide noise immunity from noise on the IC voltage supply $V_{CC}$ 140. In some example embodiments, the voltage buffer 610 generates a non-differential output.

In some example embodiments, the error voltage 125 output by the comparator 610 may be a continuous time error signal.

In some example embodiments, the error voltage 125 output by the voltage buffer 610 may be a sampled error signal. In such case, the voltage buffer 610 has clock input 133 that accepts the high-speed clock signal 120. In some example embodiments, the error signal is sampled on a rising edge of the clock signal 120. In some example embodiments, the error signal is sampled on a falling edge of the clock signal 120.

In some example embodiments, the voltage buffer 610 comprises a bias transistor 640, a bias voltage source 641, first and second bias differential transistors 650, 655, first and second load resistors 651, 656 and first and second inductors 652, 653.

The bias transistor 640 may be, in some example embodiments, an enhanced NMOS transistor having its source and bulk tied together and to ground and its drain tied to the source and bulk of each of the first and second input transistors 650, 655. The gate of the bias transistor 640 is tied to the bias voltage output by the bias voltage source 641.

The bias transistor 640 generates current to the first and second bias differential transistors 650, 655, to set the transconductance of these transistors and the gain of the voltage buffer 610 to a pre-defined level.

The bias voltage source 641 is positioned between the gate of the bias transistor 640 and ground and supplies a bias voltage to the gate of the bias transistor 640, defining the amount of current generated by the bias transistor 640.

The first bias differential transistor 650 may be, in some example embodiments, an enhanced NMOS transistor having its source and bulk tied together and to the source and bulk of the second input transistor 655 and to the drain of the bias transistor 640. The drain of the first bias differential transistor 650 is coupled to a first end of the first load resistor 651 and to the first differential output 623. The gate of the first bias differential transistor 650 is coupled to the first input 111 and to the reference voltage $V_{Ref}$ 5.

The second bias differential transistor 655 may be, in some example embodiments, an enhanced NMOS transistor having its source and bulk tied together and to the source and bulk of the first bias differential transistor 650 and to the drain of the bias transistor 640. The drain of the second bias differential transistor 655 is coupled to a first end of the second load resistor 656 and to the second differential output 624. The gate of the second bias differential transistor 655 is coupled to the second input 122 and to the regulated voltage $V_{Reg}$ 4.

The first end of the first load resistor 651 is coupled to the drain of the first bias differential transistor 650 and to the first differential output 623. The second end of the first load resistor 651 is coupled to a first end of the first inductor 652.

The first end of the second load resistor 656 is coupled to the drain of the second bias differential transistor 655 and to the second differential output 624. The second end of the second load resistor 656 is coupled to a first end of the second inductor 657.

The first end of the first inductor 652 is coupled to the second end of the first load resistor 651. The second end of the first inductor 652 is tied to a corresponding end of the second inductor 657 and to the power input 115 and to the IC supply voltage 140.

The first end of the second inductor 657 is coupled to the second end of the second load resistor 656. The second end of the second inductor 657 is tied to the second end of the first inductor 652 and to the power input 115 and to the IC supply voltage $V_{CC}$ 140.

The bias transistor 640, the first and second bias differential transistors 650, 655 and the first and second load resistors 651, 656 form a current mode logic (CML) buffer. The imposition of the first and second inductors 652, 657 in series with the first and second load resistors 651, 656 respectively, enhance high frequency gain. The buffer gain amplifies the error voltage 125 that allows the comparator function provided by the sampling latch 630 to be performed faster.

In some example embodiments, the voltage buffer 610 buffers the inputs received at its inputs 111, 112, namely the reference voltage $V_{Ref}$ 5 and regulated voltage $V_{Reg}$ 4 respectively, to provide error voltage gain and reduction of kickback, the charge injected by the sampling latch 630, that produces self-induced ripple on the regulated voltage $V_{Reg}$ 4. Such ripple would, if not reduced, such as by the imposition of the voltage buffer 610 ahead of the sampling latch 630, interfere with detection of the value of the regulated voltage $V_{Reg}$ 4. Further, the voltage buffer 610 increases system gain and consequently lock accuracy. In some example embodiments, the DC gain of the sampling latch 630 may be on the order of 4 or 5. Additionally, the voltage buffer 610 reduces ADC kickback on the regulated voltage $V_{Reg}$ 4.

Figure 7:
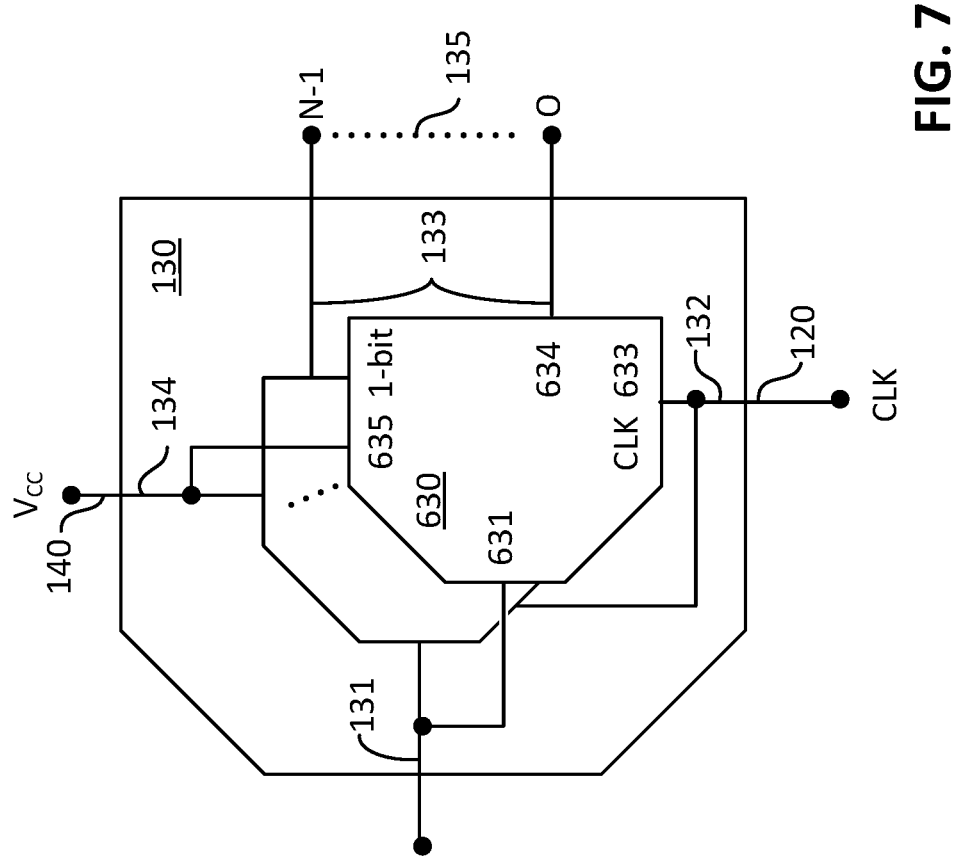
FIG. 7 is a schematic view of an example embodiment of a sampling latch suitable for use as, or as part of a comparator and as an N-bit analog-to-digital converter (ADC) in the example embodiment of FIG. 4.

Turning now to FIG. 7, there is shown an example embodiment of an implementation of a sampling latch 630. In some example embodiments the sampling latch 630 serves as, or in combination with the voltage buffer 610, as part of the comparator 110. In addition, the sampling latch 630 serves as a 1-bit ADC, so that N sampling latches 630 comprise N 1-bit ADCs 630 where N is the number of bits in the digital control stream 135, that make up the N-bit ADC 130. In some example embodiments, the 1-bit ADC 630 may be a 1-bit flash ADC.

Each of the N sampling latches 630 are coupled in parallel and each supplied with different reference voltages (not shown) to form a N-bit ADC.

Figure 7A:
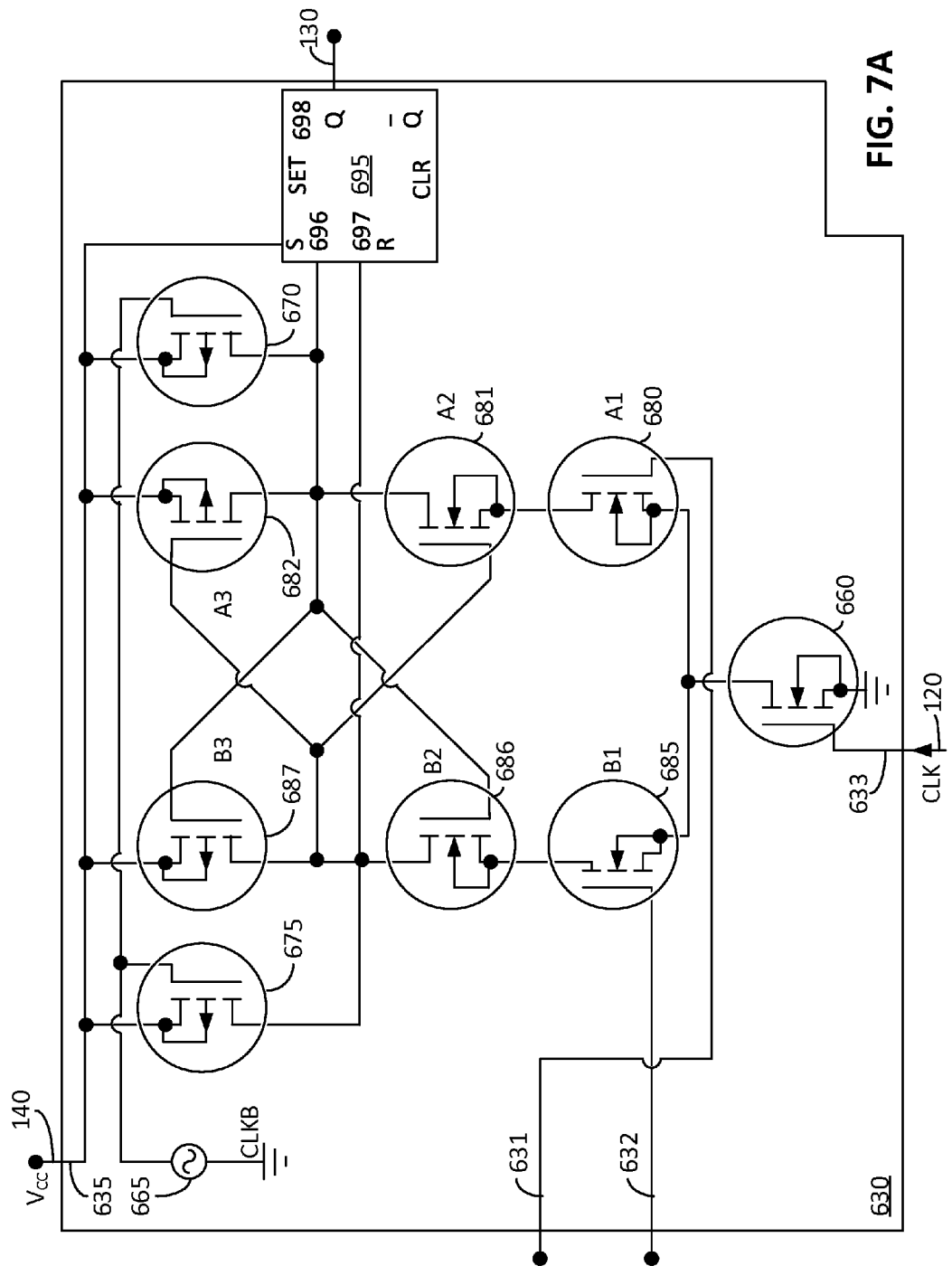
FIG. 7A is a schematic view of an example embodiment of a 1-bit analog-to-digital (ADC) suitable for use in the example embodiment of FIG. 7.

Each of the sampling latches 630 has at least two inputs 631, 633, each of which are tied together with corresponding inputs of the other sampling latches 630, for accepting the error voltage 125 and sampling clock signal 120 respectively, and an output 634 that feeds into one of the N 1-bit inputs 151 of the DAC 150. In some example embodiments and as shown in FIG. 7A, the error voltage 125 may be a differential signal that is presented to corresponding differential inputs 631, 632.

Each sampling latch 630 is powered at a power input 635 by the IC supply voltage $V_{CC}$ 140. Respective power inputs 635 of each of the sampling latches 630 are tied to the power input 134 of the ADC 130 and to common IC supply voltage $V_{CC}$ 140.

Each sampling latch 630 generates, at its output 634, a corresponding bit of the N-bit digital control stream 135 at the output 133 of the ADC 130.

In some example embodiments, the analog-to-digital conversion may occur on a positive edge of the clock signal 120.

Turning now to FIG. 7A, in some example embodiments, the sampling latch 630 comprises a clock transistor 660, an auxiliary clock 665, first and second auxiliary clock transistors 670, 675, six transistors respectively designated A1 680, A2 681, A3 682, B1 685, B2 686, B3 687 and at least one flip flop 695.

The clock transistor 660 may be, in some example embodiments, an enhanced NMOS transistor having its source and bulk tied together and to ground and its drain tied to the source and bulk of each of transistors A1 680 and B1 685. The gate of the clock transistor 660 is coupled to clock input 633 and to the sampling clock signal 120.

The auxiliary clock 665 is coupled at a first end to ground and at a second end to the gate of each of the first auxiliary clock transistor 670 and the second auxiliary clock transistor 675. The auxiliary clock 665 has the same frequency as the clock signal 120 but is substantially 180° out of phase. In some example embodiments, the auxiliary clock 665 is generated by circuitry (not shown) inverting the clock signal 120.

The second end of the auxiliary clock 665 outputs an auxiliary clock signal that is of the same frequency and substantially 180° out of phase with the clock signal 120.

The first auxiliary clock transistor 670 may be, in some example embodiments, an enhanced PMOS transistor having its source and bulk tied together and to the source and bulk of the second auxiliary clock transistor 675, to the source and bulk of each of transistors A3 682 and B3 687 and to power input 635 and to the IC supply voltage $V_{CC}$ 140. The drain of the first auxiliary clock transistor 670 is coupled to the drain of transistors A2 681 and A3 682, to the gate of transistors B2 686 and B3 687 and to a Set input 696 of flip flop 695. The gate of the first auxiliary clock transistor 670 is coupled to the gate of the second auxiliary clock transistor 675 and to the auxiliary clock signal generated by the auxiliary clock 665.

The second auxiliary clock transistor 675 may be, in some example embodiments, an enhanced PMOS transistor having its source and bulk tied together and to the source and bulk of the first auxiliary clock transistor 670, to the source and bulk of each of transistors A3 682 and B3 687 and to power input 635 and to the IC supply voltage $V_{CC}$ 115. The drain of the second auxiliary clock transistor 675 is coupled to the drain of transistors B2 686 and B3 687, to the gate of transistors A2 681 and A3 682 and to a Reset input 697 of flip flop 695. The gate of the second auxiliary clock transistor 675 is coupled to the gate of the first auxiliary clock transistor 670 and to the auxiliary clock signal generated by the auxiliary clock 665.

Transistor A1 680 may be, in some example embodiments, an enhanced NMOS transistor having its source and bulk tied together, to the source and bulk of transistor B1 685 and to the drain of clock transistor 660. The drain of transistor A1 680 is coupled to the source and bulk of transistor A2 681. The gate of transistor A1 680 is coupled to the first differential input 631.

Transistor A2 681 may be, in some example embodiments, an enhanced NMOS transistor having its source and bulk tied together and to the drain of transistor A1 680. The drain of transistor A2 681 is coupled to the drain of transistor A3 682, to the drain of the first auxiliary clock transistor 670, to the gate of transistors B2 686 and B3 687 and to the Set input 696 of flip flop 695.

Transistor A3 682 may be, in some example embodiments, an enhanced NMOS transistor having its source and bulk tied together and to the source and bulk of transistor B3 687, to the source and bulk of each of the first and second auxiliary clock transistors 670, 675 and to power input 635 and to the IC supply voltage $V_{CC}$ 140. The drain of transistor A3 682 is coupled to the drain of transistor A2 681, to the drain of the first auxiliary clock transistor 670, to the gate of transistors B2 686 and B3 687 and to the Set input 696 of flip flop 695.

Transistor B1 685 may be, in some example embodiments, an enhanced NMOS transistor having its source and bulk tied together, to the source and bulk of transistor A1 680 and to the drain of clock transistor 660. The drain of transistor B1 685 is coupled to the source and bulk of transistor B2 686. The gate of transistor B1 685 is coupled to the second differential input 632.

Transistor B2 686 may be, in some example embodiments, an enhanced NMOS transistor having its source and bulk tied together and to the drain of transistor B1 685. The drain of transistor B2 686 is coupled to the drain of transistor B3 687, to the drain of the second auxiliary clock transistor 675, to the gate of transistors A2 681 and A3 682 and to the Reset input 697 of flip flop 695.

Transistor B3 687 may be, in some example embodiments, an enhanced NMOS transistor having its source and bulk tied together and to the source and bulk of transistor A3 682, to the source and bulk of each of the first and second auxiliary clock transistors 670, 675 and to power input 635 and to the IC supply voltage $V_{CC}$ 140. The drain of transistor B3 687 is coupled to the drain of transistor B2 686, to the drain of the second auxiliary clock transistor 675, to the gate of transistors A2 681 and A3 682 and to the Reset input 697 of flip flop 695.

Flip flop 695 may be, in some example embodiments an SR flip flop. Flip flop 695 has a Set input 696 coupled to the drain of the first auxiliary clock transistor 670, to the drain of transistors A2 681 and A3 682 and to the gate of transistors B2 686 and B3 687. Flip flop 695 has a Reset input 697 coupled to the drain of the second auxiliary clock transistor 675, to the drain of transistors B2 686 and B3 687 and to the gate of transistors A2 681 and A3 682. The Set 696 and Reset 697 inputs comprise differential inputs corresponding to differential outputs from the transistor network. Flip flop 695 has a non-inverted output Q 698 that is one of the N 1-bit digital control streams that make up the N-bit digital control stream 135 and is coupled to a corresponding bit input 151 of DAC 150 to provide a non-differential output.

The flip flop 695 latches the digital output of the sampling latch 630 and presents it as one of the N 1-bit digital control streams that make up the digital control stream 135.

The components of the sampling latch 630 form a strong arm latch.

The operation of the sampling latch 630 depends in part on whether it is preceded by the voltage buffer 610. When the sampling latch 630 is used in isolation as both the comparator 110 and the ADC 130, the input 631 of the sampling latch 630 is coupled to the regulated voltage $V_{Reg}$ 4 and the input 632 is coupled to the reference voltage $V_{Ref}$ 5. At a rising edge of the clock signal 120 the voltage difference between the reference voltage $V_{Ref}$ 5 at input 632 and the regulated voltage $V_{Reg}$ 4 at input 631 will create a difference between currents entering the drains of transistors B2 686 and A2 681. The transistors B2 686 and B3 687 form a first cross-coupled inverter pair and the transistors A2 681 and A3 682 form a second cross-coupled inverter pair. The first and second inverter pairs convert this current difference into a voltage difference, charging the Set input 696 to the IC supply voltage $V_{CC}$ 140 and pulling the Reset input 697 to Ground if the reference voltage $V_{Ref}$ 5 at input 632 exceeds the regulated voltage $V_{Reg}$ 4 at input 631, or pulling the Set input 696 to ground and charging the Reset input 697 to the IC supply voltage $V_{CC}$ 140 if the regulated voltage $V_{Reg}$ 4 at input 631 exceeds the reference voltage $V_{Ref}$ 5 at input 632. The flip-flop 695 latches the difference between the Set input 696 and the Reset input 697 at a negative edge of the clock signal 120. The first and second auxiliary clock transistors 670, 675 pull the Set input 696 and the Reset input 697 respectively to the IC supply voltage $V_{CC}$ 140, preparing the sampling latch 630 for a subsequent comparison at the next rising edge of the clock signal 120. Thus, at each cycle of the clock signal 120, the output state of the non-inverted output Q 698 reflects the sign of the difference between the analog voltages applied to the first input 631, representing the regulated voltage $V_{Reg}$ 4, and to the second input, 632, representing the reference voltage $V_{Ref}$ 5, effectively implementing a 1-bit ADC operation.

However the operation of the sampling latch 630 creates a significant switching charge that is propagated back to the first input 631 and the second input 632 at every cycle of the clock signal 120. These charges can create voltage spikes of significant amplitude (on the order of several millivolts) at the first input 631 and the second input 632, if either of these inputs have high impedance. The magnitude of such kickback spikes limit the lower end of a detection range of the voltage difference presented at these inputs 631, 632. In some example embodiments, in order to mitigate such kickback, a comparator or a voltage buffer 610 which, in some example embodiments may be the CML buffer shown, may precede the sampling latch 630.

When the sampling latch 630 is preceded by the voltage buffer 610, the comparator function 110 is performed by the voltage buffer 610 in conjunction with the latch comparator function of the sampling latch 630, and the ADC 130 function is performed by the sampling latch 630. The output of the voltage buffer 610 is coupled to the first and second inputs 631, 632 of the sampling latch 630 to isolate them and to reduce propagation of any kickback voltage spikes from the sampling latch 630 back to the regulated voltage $V_{Reg}$ 4. In addition the voltage buffer 610 performs a preliminary voltage comparison between the first input 111 coupled to the reference voltage $V_{Ref}$ 5 and the second input 112 coupled to the regulated voltage $V_{Reg}$ 4, creating an amplified and inverse voltage difference at the second differential output 624 and the first differential output 623. The amount of amplification depends on the gain of the voltage buffer 610 and may, in some example embodiments, range from several times to several hundred times. The second differential output 624 may in some example embodiments be coupled to the first input 631 of the sampling latch 630 and the first differential output 623 is coupled to the second input 632 of the sampling latch 630, in which case, the operation of the sampling latch 630 is as described previously. The provision of amplified signals at the second input 632 and the first input 631 of the sampling latch 630 reduces sign detection error in the sampling latch 630, improving accuracy of the 1-bit ADC operation performed thereby.

The comparator 110 locks the regulated voltage $V_{Reg}$ 4 to the reference voltage $V_{Ref}$ 5. The lock dynamic may vary in accordance with the bandwidth and/or gain parameters of any one or more of the comparator 110, ADC 130, DAC 150, as well as the frequency of the clock signal 120 and the gain of the voltage-controlled current source 160.

The lock accuracy of the comparator 110 may vary in accordance with the gain of the voltage buffer 610 and/or the sampling latch 630.

The noise rejection performance of the supply voltage $V_{DD}$ 1 of the voltage regulator circuit 100 may vary in accordance with the gain of the comparator 110 and/or ADC 130, and/or the bandwidth of the comparator 110 and/or DAC 150.

Thus, with appropriately selected parameters, the regulated voltage $V_{Reg}$ 4 output may be defined by the reference voltage $V_{Ref}$ 5 and may be substantially independent of the value of the supply voltage $V_{DD}$ 1, and noise, process variation and temperature effects thereon.

Rather the noise on the regulated voltage $V_{Reg}$ 4 may be dependent upon the sampling aperture of the comparator 110 (if clocked by the clock signal 120) and/or the ADC 130.

Figure 8:
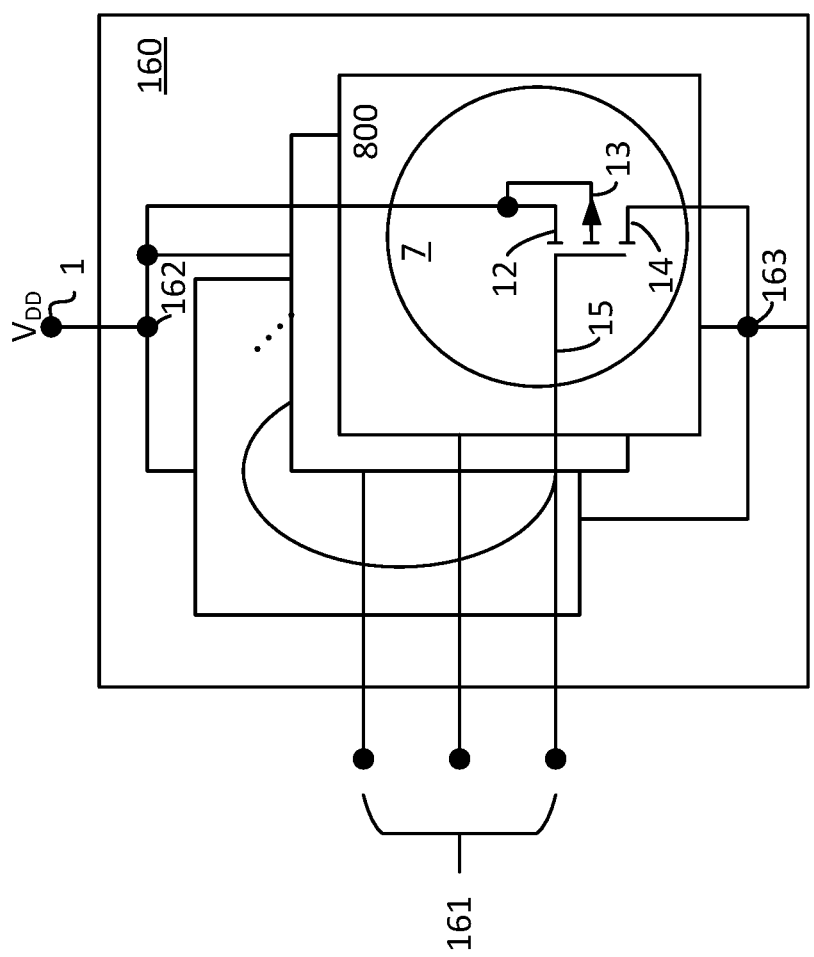
FIG. 8 is a schematic view of an example embodiment of a voltage-controlled current source suitable for use in the example embodiment of FIG. 4.

Turning now to FIG. 8, there is shown an example embodiment of an implementation of a voltage-controlled current source 160. In such example embodiment, the voltage-controlled current source 160 comprises N transistors 7, where N is the number of bits in the digital control stream 135.

Each transistor 7 may be an enhanced PMOS transistor that has a source 12, bulk 13, drain 14 and gate 15. The bulk 13 and source 12 are coupled together and tied to the supply voltage $V_{DD}$ 1, which is independent from the IC supply voltage $V_{CC}$ 140. This minimises the propagation of noise, from the comparator 110, ADC 130 and/or DAC 150, to the regulated voltage $V_{Reg}$ 4, that is independently supplied through the transistor 7 through the supply voltage $V_{DD}$ 1. In some example embodiments, this minimizes PVT dependence of the regulator circuit 100. In some example embodiments, the IC supply voltage $V_{CC}$ 140 is a fraction of the supply voltage $V_{DD}$ 1. In some example embodiments, the supply voltage $V_{DD}$ 1 may range from 1.1-1.8 VDC.

The gate 15 of each transistor 7 is coupled to a corresponding output 503 of a corresponding 1-bit DAC 500 that makes up the N-bit DAC 150. The transistor 7 draws current from the supply voltage $V_{DD}$ 1 in an amount proportional to the level of the analog control signal 155 at the output 503 of the DAC 500.

The gain of the voltage-controlled current source 160 determines the current driving capability of the regulator circuit 100. In some example embodiments, this is dependent upon the size of the transistors 7 making up the voltage-controlled current source 160.

The drain 14 of each transistor 7 is coupled together and to a first end of the capacitor 9 and provides the regulated output voltage $V_{Reg}$ 4 signal. Each transistor is independently weighted to correspond with the first voltage source $V_{Dac\_High}$ 511 and the second voltage source $V_{Dac\_Low}$ 512 that respectively represent the voltage level attributable to a "1" and a "0" of the bit stream arriving on input 501 of the DAC 500 from which the output 503 that is coupled to the gate 15 of the transistor 7 emanates. Thus, the output current generated by each of the transistors 7 is a sum of the individual currents generated by each transistor 7, weighted according to the value of N associated therewith. In some example embodiments, such weighting for a given transistor 7 may be implemented by interposing a resistor (not shown) of a specific value between the gate 15 of the transistor 7 and ground (or the supply voltage $V_{DD}$ 1 depending upon the direction of the current source).

Figure 9:
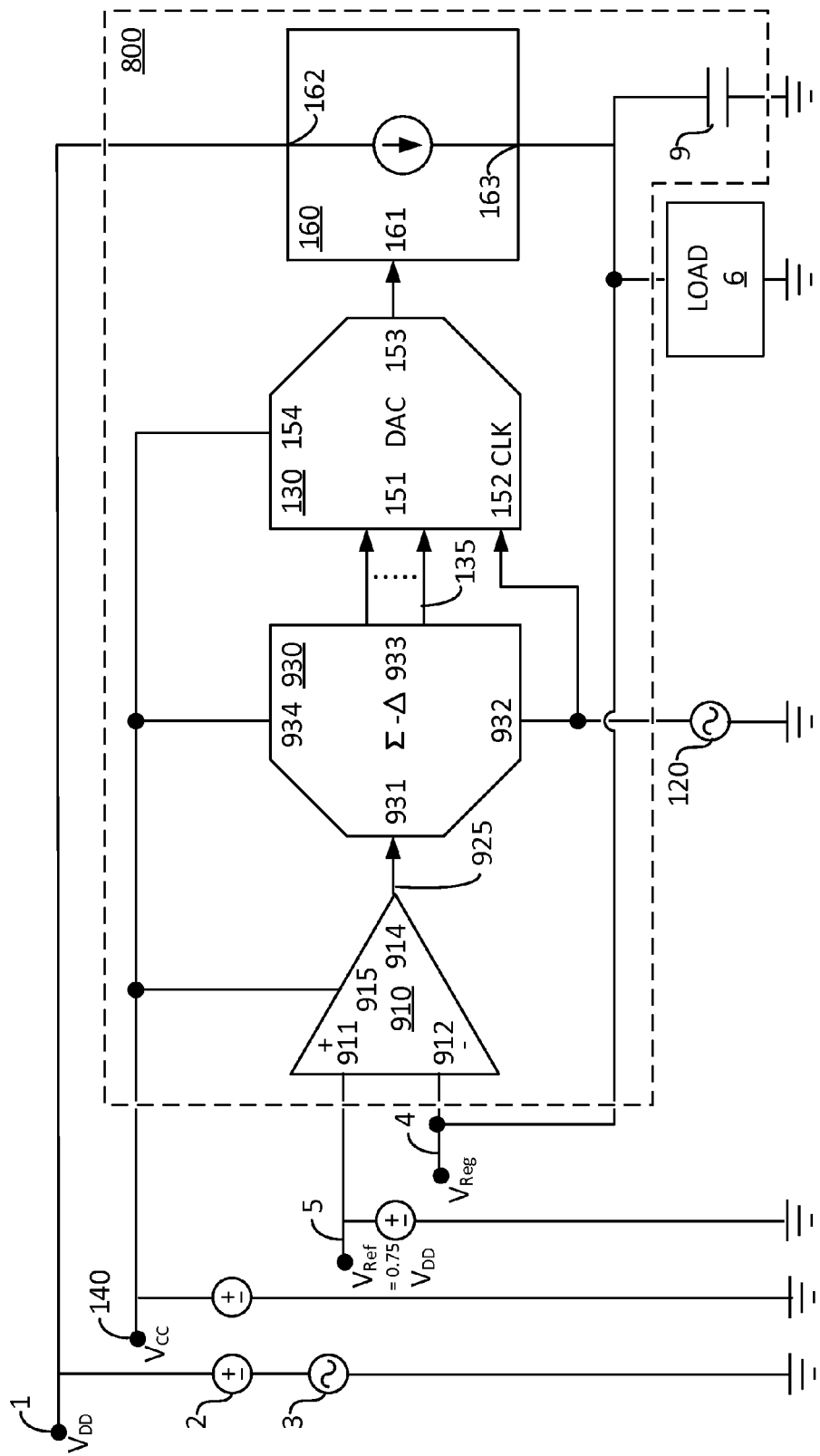
FIG. 9 is a schematic view of a low-noise sampled voltage regulator in accordance with an example embodiment of the present disclosure.

A second example embodiment of the low-noise sampled voltage regulator circuit is shown in FIG. 9. The regulator circuit, shown generally at 900, comprises a voltage error generator such as an operational amplifier (Op-Amp) 910, an analog-to-digital converter (ADC) 930, DAC 150, a voltage-controlled current source 160 and a decoupling capacitor 9.

The Op-Amp 910 has two inputs 911, 912 and an output 914. The first input 911 is a positive input and is coupled to the reference voltage $V_{Ref}$ 5. The second input 912 is a negative input and is coupled to the regulated voltage $V_{Reg}$ 4. The output 914 of the Op-Amp 910 is coupled to an input 931 of the ADC 930 and outputs an error voltage 925.

Since the regulated voltage $V_{Reg}$ 4 is generated by the voltage-controlled current source 160 from processing by the voltage regulator circuit 100 of the output of the feedback element, a feedback circuit in the form of a voltage-locked loop is created.

The Op-Amp 910 is supplied at power input 915 with the IC supply voltage $V_{CC}$ 140, which is shared by corresponding power input 934 of the ADC 930 and/or corresponding power input 154 of the DAC 150. The IC supply voltage $V_{CC}$ 140 is independent from the supply voltage $V_{DD}$ 1. This minimises the propagation of noise, from the ADC 930 and/or DAC 150, to the regulated voltage $V_{Reg}$ 4, that is independently supplied through the voltage-controlled current source 160 through the supply voltage $V_{DD}$ 1. In some example embodiments, this minimizes PVT dependence of the regulator circuit 100.

The Op-Amp 910 serves as a comparator generating a continuous time error voltage 925 representing a difference between the reference voltage $V_{Ref}$ 5 and the regulated voltage $V_{Reg}$ 4. In some example embodiments, the gain of the Op-Amp 910 may be in excess of 20.

The ADC 930 is a Sigma-Delta ($\Sigma$-$\Delta$) modulator producing a pseudo-random bit stream, whose average value is equal to the error voltage. In some example embodiments, a 1-bit $\Sigma$-$\Delta$ modulator may provide adequate performance, especially if the frequency of a clock signal 120 exceeds several hundred MHz.

The ADC 930 has two inputs 931, 932 and an output 933. The first input 931 is coupled to the output 914 of the Op-Amp 910 and accepts the error voltage 925. The second input 932 is coupled to a high-speed clock signal 120 which, in some example embodiments, is the same or at the same frequency as a clock signal feeding clock input 152 of the DAC 150. In some example embodiments, the clock signal 120 has a frequency substantially in excess of 100 MHz. The use of a Sigma-Delta ($\Sigma$-$\Delta$) modulator supports the reduction of the frequency of the clock signal 120 from that of regulator 100 by one or more orders of magnitude. The output 933 of the ADC 830 is coupled to input 151 of the DAC 150 and outputs the N-bit digital control stream 135.

The ADC 930 is supplied at power input 934 with the IC supply voltage $V_{CC}$ 140, which is shared by corresponding power input 915 of the Op-Amp 910 and/or corresponding power input 154 of the DAC 150. The IC supply voltage $V_{CC}$ 140 is independent from the supply voltage $V_{DD}$ 1. This minimises the propagation of noise, from the Op-Amp 910, and/or DAC 500, to the regulated voltage $V_{Reg}$ 4, that is independently supplied through the voltage-controlled current source 160 through the supply voltage $V_{DD}$ 1. In some example embodiments, this minimizes PVT dependence of the regulator circuit 100.

The ADC 930 samples the error voltage 925 at the frequency of the clock signal 120 and generates an N-bit digital control stream 135 clocked at the frequency of the clock signal 120. In generating the digital control stream 135, any flicker from the regulated voltage $V_{Reg}$ 4 that is manifested in the error voltage 125, is up-converted from at or near DC to the frequency of the clock signal 120.

The DAC 150 is substantially identical to and is configured substantially identically to the DAC 150 of FIG. 4. The first input 151 of the DAC 150 is coupled to the output 933 of the ADC 830 and accepts the N-bit digital control stream 135.

The voltage-controlled current source 160 is substantially identical to and is configured substantially identically to the voltage-controlled current source of FIG. 8.

The decoupling capacitor 9 is substantially identical to and is configured substantially identically to the decoupling capacitor 9 of FIG. 4.

Figure 2:
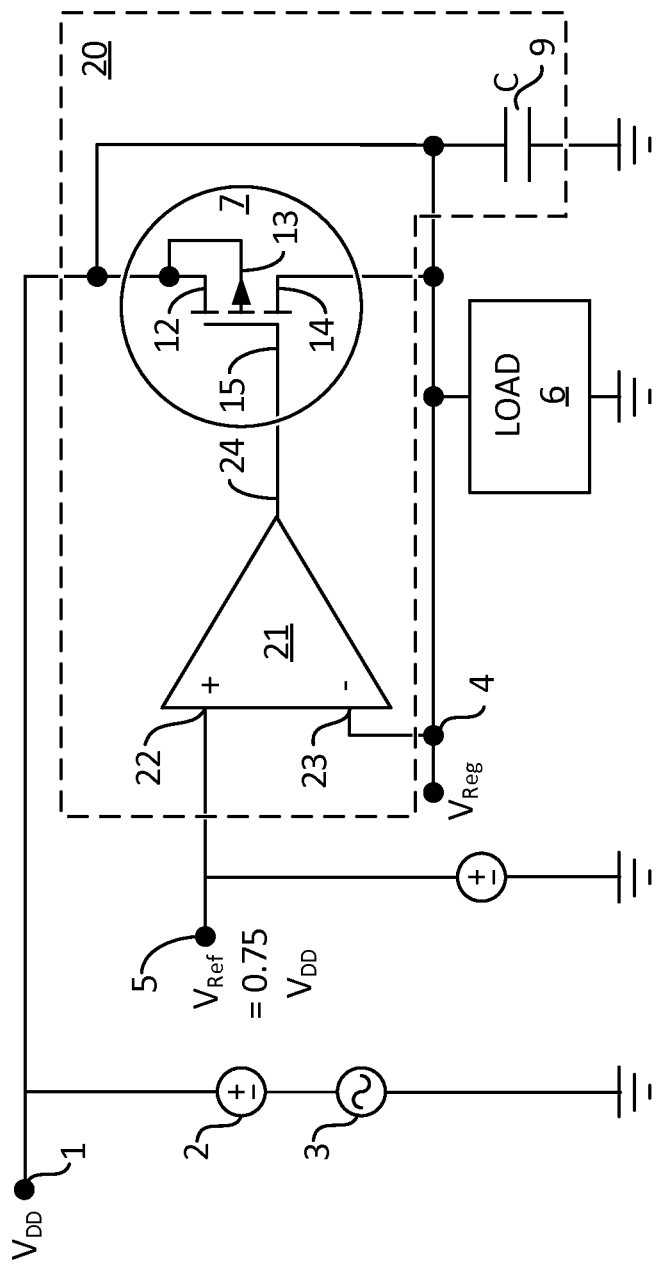
FIG. 2 is a schematic view of an operational amplifier (Op-Amp) based voltage regulator circuit.
Figure 3:
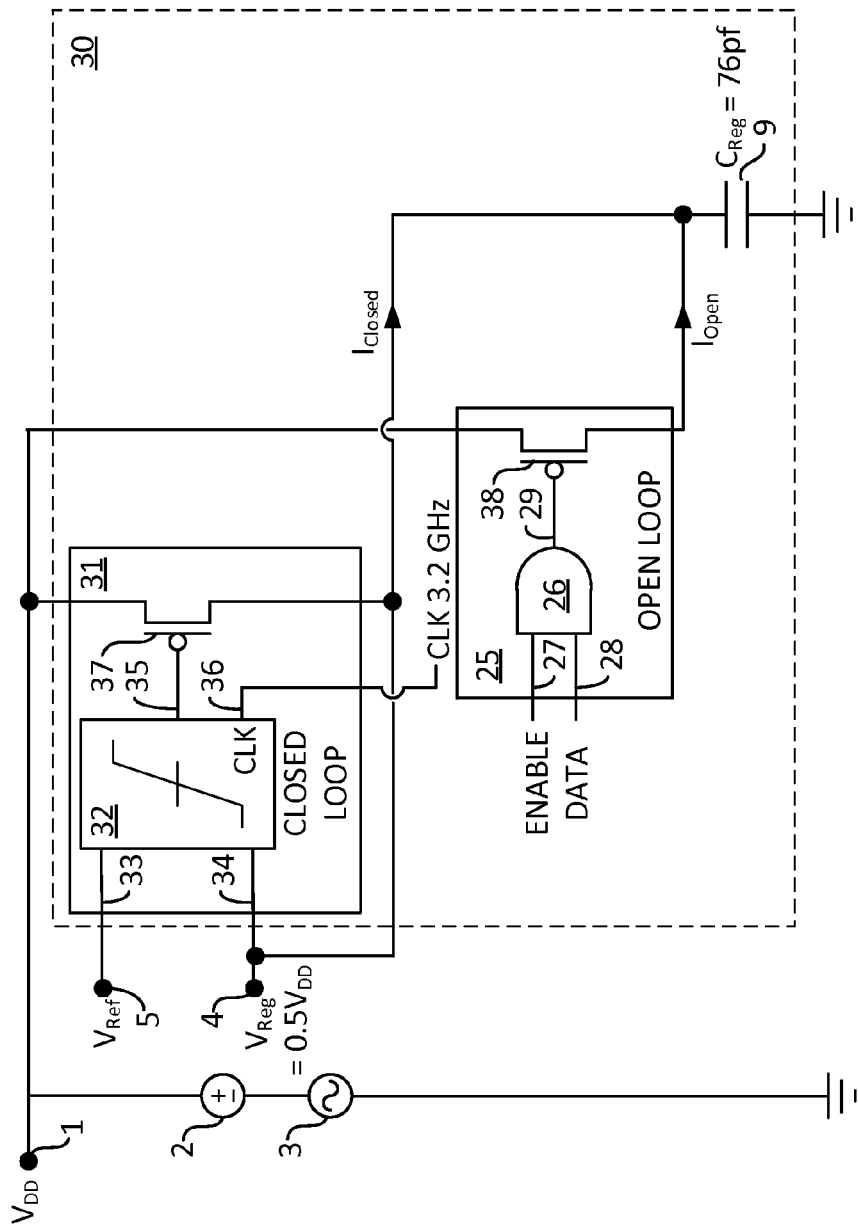
FIG. 3 is a schematic view of a transmitter regulator circuit using a Strong Arm latch comparator.
Figure 10:
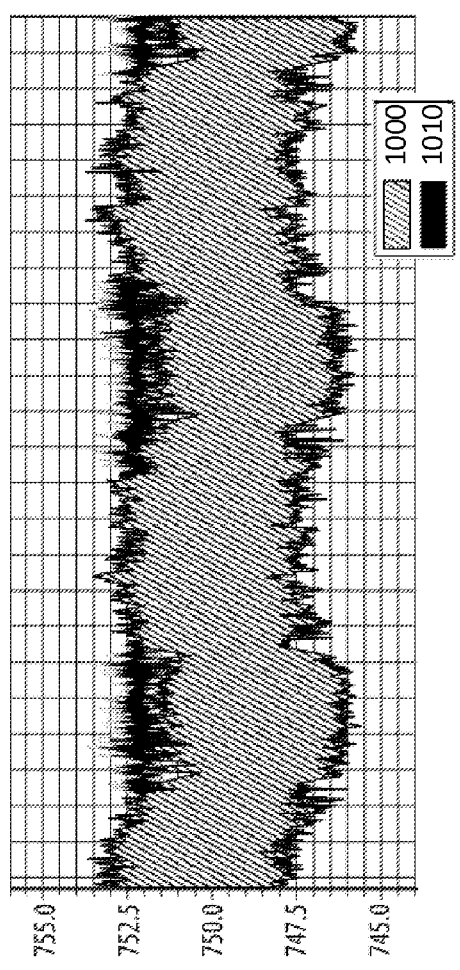
FIG. 10 is a graph showing an example of regulated voltage as a function of time that may be achieved using a low-noise sampled voltage regulator in accordance with an example embodiment of the present disclosure.

Turning now to FIG. 10, there is shown example simulation traces as a function of time showing voltage regulation results generated by an example embodiment of the voltage regulator circuit 100 as a function of time. Trace 1000 shows regulated voltage performance of a closed loop sampling latch regulator 20 similar to the example embodiment of FIG. 2. Trace 1010 shows regulated voltage $V_{Reg}$ 4 performance of a voltage regulator circuit 100 similar to the example embodiment of FIG. 4, with the voltage buffer 610 and sampling latch 630 performing the comparator 110 function, the sampling latch performing the ADC 130 function and the DAC 150 comprising N 1-bit DACs 500. In both cases, the load 6 was a VCO that served to provide the high-speed clock signal 120 to the voltage regulator circuit 100.

The supply noise 3 on the supply voltage $V_{DD}$ 1 was set to about 48 mV peak to peak at 1 MHz. Trace 1010 shows an approximate improvement in voltage regulation of about 16 dB.

Figure 11:
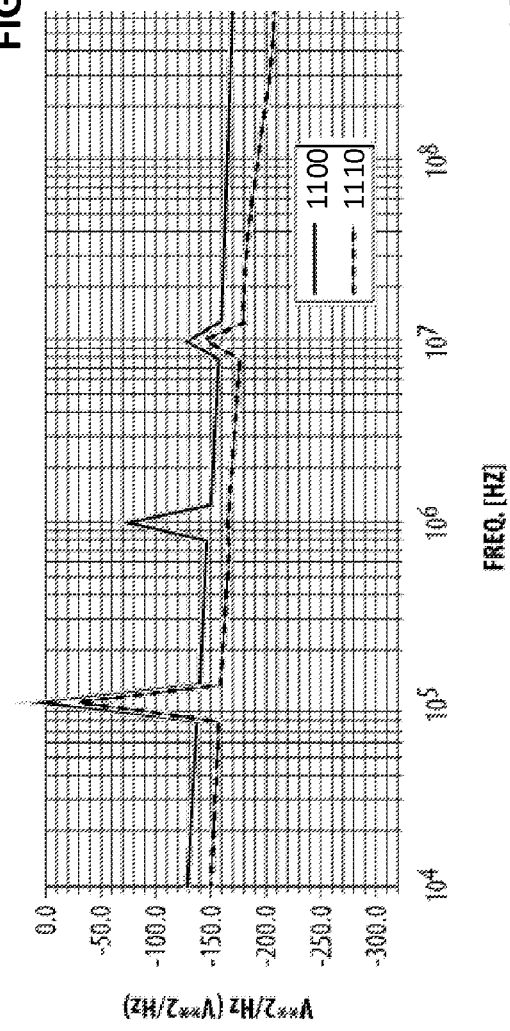
FIG. 11 is a graph showing an example of output noise as a function of time that may be achieved using a low-noise sampled voltage regulator in accordance with an example embodiment of the present disclosure.

Turning now to FIG. 11, there is shown example simulation traces as a function of time showing output noise results generated by an example embodiment of the voltage regulator circuit 100 as a function of time for the configuration of FIG. 10. Trace 1100 shows latch output noise. Trace 1110 shows output noise of the regulated voltage $V_{Reg}$ 4 generated by the voltage regulator circuit 100. Both traces show output noise levels below −140 dBc at 1 MHz offset. This is within voltage supply specifications for typical high-speed VCO circuits, which may be specified as being less than 120 dBc at 1 MHz.

Figure 12:
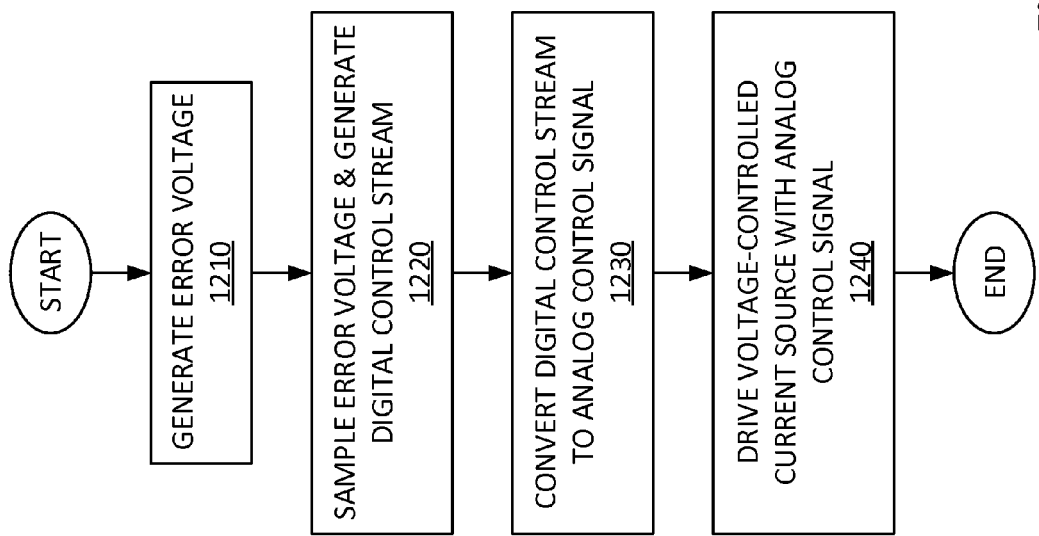
FIG. 12 is a flow chart showing example actions that may be performed in accordance with an example embodiment of the present disclosure.

Turning now to FIG. 12, there is shown a flow chart showing example actions that may be taken in a method for providing a regulated voltage supply $V_{Reg}$ 4, for a load 6, that approaches the reference voltage $V_{Ref}$ 5.

An action 1210 comprises generating an error voltage 125 representing a difference between the reference voltage $V_{Ref}$ 5 and the regulated voltage $V_{Reg}$ 4. The action 1210 may be performed by a voltage error generator such as comparator 110 or Op-Amp 910.

An action 1220 comprises sampling the error voltage 125 at a first clock frequency that may be provided by clock signal 120, to generate a digital control stream 135. The action 1220 may be performed by an ADC such as ADC 130 or modulator 930.

An action 1230 comprises converting the digital control stream 135 to an analog control signal. The action 1230 may be performed by a DAC such as DAC 150.

An action 1240 comprises driving a voltage-controlled current source 160 with the analog control signal to generate the regulated voltage supply 4.

The voltage regulator circuit 100 may be implemented on an integrated circuit occupying very small silicon area or may be implemented in discrete fashion.

Having described in detail example embodiments that are in accordance with the present disclosure, it is noted that the embodiments reside primarily in combinations of apparatus components and processing actions related to interactions between such components.

In some example embodiments, the regulator may form part of a base station. In some example embodiments, the regulator may form part of a mobile communications device. Although some embodiments may include mobile devices, not all embodiments are limited to mobile devices; rather, various embodiments may be implemented within a variety of communications devices or terminals, including handheld devices, mobile telephones, or personal digital assistants (PDAs).

The present disclosure can be implemented in digital electronic circuitry, or in computer hardware, firmware, software, or in combination thereof. Apparatus of the disclosure can be implemented in a computer program product tangibly embodied in a machine-readable storage device for execution by a programmable processor and method actions can be performed by a programmable processor configured to perform a function by being programmed to execute a program of instructions to perform functions of the disclosure by operating on input data and generating output, wired or otherwise constructed to have the ability to perform a function when configured, coupled or implemented as described herein.

The disclosure can be implemented advantageously on a programmable system including at least one input device, and at least one output device.

Moreover, explicit use of the term "module", "processor" or "controller" should not be construed to refer exclusively to a particular configuration of hardware.

In some instances, detailed descriptions of well-known devices, circuits and methods are omitted so as not to obscure the description of the present disclosure with unnecessary detail.

In the foregoing disclosure, for purposes of explanation and not limitation, specific details are set forth in order to provide a thorough understanding of the present disclosure.

Accordingly, the system and method components have been represented where appropriate by conventional symbols in the drawings, showing only those specific details that are pertinent to understanding the embodiments of the present disclosure, so as not to obscure the disclosure with details that will be readily apparent to those of ordinary skill in the art having the benefit of the description herein.

Any feature or action shown in dashed outline may in some example embodiments be considered as optional.

Certain terms are used throughout to refer to particular components. Manufacturers may refer to a component by different names. Use of a particular term or name is not intended to distinguish between components that differ in name but not in function.

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

The terms "couple" and "communicate" in any form are intended to mean either a direct connection or indirect connection through some interface, device, intermediate component or connection, whether electrically, mechanically, chemically, or otherwise.

Directional terms such as "upward", "downward", "left" and "right" are used to refer to directions in the drawings to which reference is made unless otherwise stated. Similarly, words such as "inward" and "outward" are used to refer to directions toward and away from, respectively, the geometric center of the device, area or volume or designated parts thereof. Moreover, all dimensions described herein are intended solely to be by way of example for purposes of illustrating certain embodiments and are not intended to limit the scope of the disclosure to any embodiments that may depart from such dimensions as may be specified.

References in the singular form include the plural and vice versa, unless otherwise noted.

As used herein, relational terms, such as "first" and "second", and numbering devices such as "a", "b" and the like, may be used solely to distinguish one entity or element from another entity or element, without necessarily requiring or implying any physical or logical relationship or order between such entities or elements.

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated that block diagrams reproduced herein can represent conceptual views of illustrative components embodying the principles of the technology.

The purpose of the Abstract is to enable the relevant patent office or the public generally, and specifically, persons of ordinary skill in the art who are not familiar with patent or legal terms or phraseology, to quickly determine from a cursory inspection, the nature of the technical disclosure. The Abstract is neither intended to define the scope of this disclosure, which is measured by its claims, nor is it intended to be limiting as to the scope of this disclosure in any way.

While example embodiments are disclosed, this is not intended to be limiting. Rather, the general principles set forth herein are considered to be merely illustrative of the scope of the present disclosure.

It will be apparent that various modifications and variations covering alternatives, modifications and equivalents may be made to the embodiments disclosed herein, without departing from the spirit and scope of the present disclosure, as defined by the appended claims.

For example, the various elements or components may be combined or integrated in another system or certain features may be omitted, or not implemented. Also, techniques, systems, subsystems and methods described and illustrated in the various embodiments as discrete or separate may be combined or integrated with other systems, modules, techniques, or methods without departing from the scope of the present disclosure. Other examples of changes, substitutions, and alterations are easily ascertainable and could be made without departing from the spirit and scope disclosed herein.

In particular, features from one or more of the above-described embodiments may be selected to create alternative embodiments comprised of a sub-combination of features that may not be explicitly described above. In addition, features from one or more of the above-described embodiments may be selected and combined to create alternative embodiments comprised of a combination of features that may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

Other embodiments consistent with the present disclosure will be apparent from consideration of the specification and the practice of the disclosure disclosed therein. Accordingly the specification and the embodiments disclosed therein are to be considered examples only, with a true scope and spirit of the disclosure being disclosed by the following numbered claims:

What is claimed is:

1. A voltage regulator circuit configured to provide a regulated voltage for a load, that approaches a known reference voltage, comprising:
    a voltage error generator configured to generate an error voltage representing a difference between the reference voltage and the regulated voltage;
    a first clock signal at a first clock frequency;
    converter configured to sample the error voltage at the first clock frequency and generate a first control signal in which a noise component of the error voltage is up-converted to substantially the first clock frequency;
    a filter configured to generate at least one second control signal from the first control signal in which the up-converted noise thereof is substantially reduced from the at least one second control signal; and
    a voltage-controlled current source driven by the at least one second control signal configured to generate the regulated voltage supply.

2. A voltage regulator circuit according to claim 1, wherein the voltage error generator has a first input coupled to the reference voltage and a second input coupled to the regulated voltage supply generated by the voltage-controlled current source.

3. A voltage regulator circuit according to claim 1, wherein the voltage error generator is a comparator.

4. A voltage regulator circuit according to claim 3, wherein the comparator comprises a voltage buffer.

5. A voltage regulator circuit according to claim 3, wherein the comparator comprises at least one sampling latch.

6. A voltage regulator circuit according to claim 3, wherein the comparator is clocked by a second clock signal and the error voltage is a sampled error signal sampled at a frequency of the second clock signal.

7. A voltage regulator circuit according to claim 6, wherein the first and second clock signals have a common frequency.

8. A voltage regulator circuit according to claim 7, wherein the first and second clock signals are the same.

9. A voltage regulator circuit according to claim 1, wherein the error voltage is a continuous time error signal.

10. A voltage regulator circuit according to claim 1, wherein the voltage error generator is an operational amplifier (Op-Amp).

11. A voltage regulator circuit according to claim 1, wherein the voltage error generator is supplied by a power supply that is independent of a power supply for the voltage controlled current source.

12. A voltage regulator circuit according to claim 1, wherein the voltage error generator has differential outputs for generating a differential error voltage signal.

13. A voltage regulator circuit according to claim 1, wherein the first clock frequency is in excess of 100 Hz.

14. A voltage regulator circuit according to claim 13, wherein the first clock frequency is about 9.6 GHz.

15. A voltage regulator circuit according to claim 13, wherein the first clock frequency is about 19.6 GHz.

16. A voltage regulator circuit according to claim 1, wherein the first clock signal is generated by the load.

17. A voltage regulator circuit according to claim 1, wherein the converter is an N-bit analog-to-digital converter (ADC) that generates an N-bit digital control stream as the first control signal.

18. A voltage regulator circuit according to claim 17, wherein N is 1.

19. A voltage regulator circuit according to claim 17, where N exceeds 1 and the ADC comprises a plurality of sampling latches each comprising a 1-bit ADC, each configured to generate one bit of the N-bit digital control stream.

20. A voltage regular circuit according to claim 1, wherein the converter is a Sigma-Delta ($\Sigma$-$\Delta$) modulator.

21. A voltage regulator circuit according to claim 1, wherein the converter is supplied by a power supply that is independent of a power supply for the voltage-controlled current source.

22. A voltage regulator circuit according to claim 1, wherein the converter has differential inputs for accepting a differential error voltage signal.

23. A voltage regulator circuit according to claim 1, wherein the filter is an N-bit digital-to-analog (DAC) for converting the first control signal that is an N-bit digital control stream.

24. A voltage regulator according to claim 23, wherein N is 1.

25. A voltage regulator circuit according to claim 23, where N exceeds 1 and the DAC comprises a plurality of 1-bit DACs, each configured to convert one bit of the N-bit digital control stream.

26. A voltage regulator circuit according to claim 1, wherein the filter comprises a switched-capacitor charge summer.

27. A voltage regulator circuit according to claim 1, wherein the filter comprises a low pass filter.

28. A voltage regulator circuit according to claim 27, wherein the low pass filter is a one-stage RC filter.

29. A voltage regulator circuit according to claim 1, wherein the filter is clocked by a second clock signal and the error voltage is a sampled-error signal sampled at a frequency of the second clock signal.

30. A voltage regulator circuit according to claim 29, wherein the first and second clock signals have a common frequency.

31. A voltage regulator circuit according to claim 30, wherein the first and second clock signals are the same.

32. A voltage regulator circuit according to claim 1, wherein the filter is supplied by a power supply that is independent of a power supply for the voltage-controlled current source.

33. A voltage regulator circuit according to claim 1, wherein the voltage-controlled current source comprises at least one transistor.

34. A voltage regulator circuit according to claim 33, wherein the at least one transistor has a gate driven by one of the at least one second control signals.

35. A voltage regulator circuit according to claim 34, wherein the at least one second control signal is weighted to correspond to a weight of the filter from which the at least one second control signal emanates.

36. A voltage regulator circuit according to claim 33, wherein the at least one transistor has a source coupled to a power supply that is independent of any power supply that may provide power for a component selected from a group consisting of the feedback element, the converter, the filter and any combination of any of these.

37. A voltage regulator circuit according to claim 33, wherein the at least one transistor has a drain coupled to the regulated voltage supply and to an input of the voltage error generator.

38. A voltage regulator circuit according to claim 1, further comprising a decoupling capacitor positioned between the regulated voltage supply and ground.

39. A voltage regulator circuit according to claim 1, wherein the voltage regulator circuit comprises an integrated circuit.

40. A voltage regulator circuit according to claim 1, wherein the load is a voltage-controlled oscillator.

41. A method for providing a regulated voltage for a load, that approaches a reference voltage, comprising actions of:
   generating an error voltage representing a difference between the reference voltage and the regulated voltage;
   sampling the error voltage at a first clock frequency to generate a first control signal in which a noise component of the error voltage is up-converted to substantially the first clock frequency;
   converting the first control stream to at least one second control signal in which the up-converted noise of the first control signal is substantially reduced from the at least one second control signal; and
   driving a voltage-controlled current source with the at least one second control signal to generate the regulated voltage supply.

* * * * *

UNITED STATES PATENT AND TRADEMARK OFFICE
CERTIFICATE OF CORRECTION

PATENT NO.        : 9,501,073 B2                                      Page 1 of 1
APPLICATION NO.   : 14/594290
DATED             : November 22, 2016
INVENTOR(S)       : Dmitry Petrov It is certified that error appears in the above-identified patent and that said Letters Patent is hereby corrected as shown below:

In the Specification

Column 6, Line 51, "The is configured to sample the error voltage at the first clock signal and to generate" should read --The converter is configured to accept the first clock signal and to mix the error voltage with the first clock signal to generate--.

Column 7, Line 46, "at least one control signals." should read --at least one second control signals.--.

Signed and Sealed this
Fourteenth Day of February, 2017

Michelle K. Lee
*Director of the United States Patent and Trademark Office*